(12) United States Patent
Yang et al.

(10) Patent No.: US 12,199,567 B2
(45) Date of Patent: Jan. 14, 2025

(54) PHOTOVOLTAIC POWER GENERATION SYSTEM AND METHOD AND DEVICE FOR DETECTING EARTH FAULT OF PHOTOVOLTAIC STRING

(71) Applicant: Huawei Digital Power Technologies Co., Ltd., Shenzhen (CN)

(72) Inventors: Boping Yang, Shanghai (CN); Huan Zhao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 58 days.

(21) Appl. No.: 18/187,882

(22) Filed: Mar. 22, 2023

(65) Prior Publication Data

US 2023/0223902 A1 Jul. 13, 2023

Related U.S. Application Data

(63) Continuation of application No. PCT/CN2020/116710, filed on Sep. 22, 2020.

(51) Int. Cl.
*H02S 50/10* (2014.01)

(52) U.S. Cl.
CPC .................................... *H02S 50/10* (2014.12)

(58) Field of Classification Search
CPC ...................................................... H02S 50/10
See application file for complete search history.

(56) References Cited

U.S. PATENT DOCUMENTS

| 9,799,779 B2 | 10/2017 | Krein et al. | |
| 2013/0170084 A1* | 7/2013 | Strobl | G01R 31/69 361/79 |

(Continued)

FOREIGN PATENT DOCUMENTS

| CN | 102158129 A | 8/2011 |
| CN | 107086601 A | 8/2017 |
| CN | 108008176 A | 5/2018 |

(Continued)

OTHER PUBLICATIONS

Hui et al., "Identification and Location Methods for Intelligent PV System Malfunctions", Smart Grid, vol. 4, No. 11, Nov. 2016, 4 pages with English abstract.

*Primary Examiner* — Reena Aurora
(74) *Attorney, Agent, or Firm* — Maier & Maier, PLLC

(57) ABSTRACT

A photovoltaic power generation system and a method and a device for detecting an earth fault of a photovoltaic string. The controller obtains a terminal voltage of each photovoltaic string before voltage disturbance, where the terminal voltage is a voltage to earth of a positive electrode or negative electrode of the photovoltaic string; performs voltage disturbance on each photovoltaic string and obtains a terminal voltage of each photovoltaic string after the voltage disturbance; determines a photovoltaic string with an earth fault based on the terminal voltage of each photovoltaic string before and after the voltage disturbance; obtains a photovoltaic panel with an earth fault by using the terminal voltage and an output voltage of the photovoltaic string before the voltage disturbance, or obtains a photovoltaic panel with an earth fault by using the terminal voltage and an output voltage of the photovoltaic string after the voltage disturbance.

20 Claims, 11 Drawing Sheets

(56) References Cited

U.S. PATENT DOCUMENTS

2014/0225444 A1* 8/2014 Yoshidomi ............. H02S 50/10
324/509
2022/0271712 A1* 8/2022 Gao ....................... H02H 5/041

FOREIGN PATENT DOCUMENTS

| CN | 110768628 A | 2/2020 |
| --- | --- | --- |
| EP | 2677330 A1 | 12/2013 |
| JP | 2016167933 A | 9/2016 |
| WO | 2013010083 A2 | 1/2013 |

* cited by examiner

PHOTOVOLTAIC POWER GENERATION SYSTEM AND METHOD AND DEVICE FOR DETECTING EARTH FAULT OF PHOTOVOLTAIC STRING

CROSS-REFERENCE TO RELATED APPLICATIONS

This application is a continuation of International Application No. PCT/CN2020/116710, filed on Sep. 22, 2020, the disclosure of which is hereby incorporated by reference in its entirety.

TECHNICAL FIELD

The embodiments relate to the field of photovoltaic power generation technologies, a photovoltaic power generation system, a method, and a device for detecting an earth fault of a photovoltaic string.

BACKGROUND

At present, photovoltaic power generation is increasingly valued. A direct current output by a photovoltaic array is converted into an alternating current by an inverter, and then the alternating current may be fed back to an alternating current power grid. To improve power output, a photovoltaic array may include a plurality of photovoltaic strings connected in series and in parallel.

In actual application, a photovoltaic array is prone to an earth fault, also known as a ground fault. A common cause of an earth fault of a photovoltaic array includes: a cable insulation damage of the photovoltaic array, a short circuit to earth in a photovoltaic string, a temporary short circuit to earth in the photovoltaic array due to weather or other reasons, or the like. A large leakage current is caused when a photovoltaic array encounters an earth fault, which may cause a safety accident.

According to the IEC 62109-2 standard, a direct current insulation resistance to earth of a photovoltaic array needs to be detected before a photovoltaic inverter is powered on. In a non-isolated application scenario, if a direct current insulation resistance is low (which cannot meet a leakage current requirement), an inverter cannot be powered on until the direct current insulation resistance restores to a normal value.

Currently, when a photovoltaic power generation system determines, by detecting a direct current insulation resistance, that an earth fault occurs, a location of the earth fault cannot be determined, and photovoltaic strings need to be manually checked one by one on site, which is time-consuming and inefficient.

SUMMARY

The embodiments may provide a photovoltaic power generation system and a method and a device for detecting an earth fault of a photovoltaic string, to detect whether the photovoltaic string has an earth fault and automatically determine a fault location, thereby improving efficiency.

An embodiment may provide a photovoltaic power generation system, including a photovoltaic array, a photovoltaic device, and a controller. The photovoltaic array includes m photovoltaic strings, where m is an integer greater than or equal to 1. The photovoltaic device includes m power conversion circuits. The power conversion circuits are in a one-to-one correspondence with the photovoltaic strings, and each photovoltaic string is connected to a corresponding power conversion circuit. The controller is configured to: obtain a terminal voltage of each photovoltaic string before voltage disturbance, where the terminal voltage is a voltage to earth of a positive electrode or negative electrode of the photovoltaic string, namely a voltage to earth of PV+ or PV−; perform voltage disturbance on each photovoltaic string and obtain a terminal voltage of each photovoltaic string after the voltage disturbance, where when an earth fault occurs inside a photovoltaic string, the terminal voltage of the photovoltaic string after the voltage disturbance varies obviously from that before the voltage disturbance; determine a photovoltaic string with an earth fault based on the terminal voltage of each photovoltaic string before the voltage disturbance and the terminal voltage of each photovoltaic string after the voltage disturbance; and for the photovoltaic string with an earth fault, obtain a photovoltaic panel with an earth fault by using the terminal voltage and an output voltage of the photovoltaic string before the voltage disturbance, or obtain a photovoltaic panel with an earth fault by using the terminal voltage and an output voltage of the photovoltaic string after the voltage disturbance.

The photovoltaic device may be an inverter, and the photovoltaic device includes a direct current/direct current (DC/DC) conversion circuit and a direct current/alternating current (DC/AC) conversion circuit. The photovoltaic strings are connected to an input terminal of the direct current/direct current (DC/DC) conversion circuit, and an output terminal of the DC/DC conversion circuit is configured to connect to an inverter circuit. The DC/DC conversion circuit and the inverter circuit may be integrated into the inverter, and a controller of the inverter is used to detect an earth fault of a photovoltaic string. Alternatively, a controller may be disposed independently to detect an earth fault of a photovoltaic string. There may be no DC/DC circuit in the inverter, and there is only a DC/AC conversion circuit. The inverter may be a single-phase inverter or may be a three-phase inverter.

When the terminal voltage of a photovoltaic string before the voltage disturbance and the terminal voltage of a photovoltaic string after the voltage disturbance vary obviously, it indicates that an earth fault occurs in the photovoltaic string. All photovoltaic panels in a photovoltaic string are connected in series. When a short circuit to earth occurs at a point in the photovoltaic string, an electrical potential of a location at which an earth fault occurs is a reference ground. Therefore, a reference potential of a terminal voltage of the photovoltaic string is a ground potential at the location at which the earth fault occurs, and a location at which the earth fault occurs may be determined by using a proportion between the terminal voltage and an output voltage of the entire string. The method is simple and easy to implement, and does not require any additional hardware device. A photovoltaic panel with an earth fault can be automatically determined without the need for manually performing detection on N photovoltaic panels of a photovoltaic string one by one, thereby achieving high detection efficiency.

Whether the terminal voltage before the disturbance is subtracted by the terminal voltage after the disturbance or whether the terminal voltage after the disturbance is subtracted by the terminal voltage before the disturbance may not be limited. An absolute value of a variation of the voltages may matter. The voltage disturbance may control the terminal voltage to change in an increasing direction, or may control the terminal voltage to change in a decreasing direction. The controller may be configured to: when an absolute value of a difference between the terminal voltage of the photovoltaic string before the voltage disturbance and the terminal voltage of the photovoltaic string after the voltage disturbance exceeds a preset threshold, determine that the photovoltaic string is a photovoltaic string with an earth fault.

The controller may be configured to control an output voltage of a voltage-disturbed photovoltaic string to change along a voltage increasing direction or change along a voltage decreasing direction.

An open-circuit voltage may be the maximum voltage. Therefore, the open-circuit voltage is used in a default state, and there is no need for control. The controller may be configured to control the output voltage of the voltage-disturbed photovoltaic string to change from an open-circuit voltage before the voltage disturbance to a first preset voltage after the voltage disturbance, where the first preset voltage is less than the open-circuit voltage.

When a current and voltage scan is performed, an open-circuit voltage may be controlled to change to a short-circuit voltage. In other words, a voltage changes from a large value to a small value. The controller may be configured to control the output voltage of the voltage-disturbed photovoltaic string to change from an open-circuit voltage before the voltage disturbance to a short-circuit voltage after the voltage disturbance.

Photovoltaic panels in a photovoltaic string may be connected in series and the photovoltaic panels connected in series may perform voltage division on voltages at two ends of the photovoltaic string. Therefore, a location of an earth fault may be obtained by using a proportion. The controller may be configured to obtain the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series.

The controller may be configured to: when the terminal voltage is the voltage to earth of the positive electrode, obtain the photovoltaic panel with an earth fault according to the following formula:

$$x=N*(Upv+/Upv); \text{ or}$$

when the terminal voltage is the voltage to earth of the negative electrode, obtain the photovoltaic panel with an earth fault according to the following formula:

$$x=N*(1-|Upv-|/Upv), \text{ where}$$

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

The controller may be configured to obtain the photovoltaic panel with an earth fault by using a ratio between the terminal voltage and the output voltage of the photovoltaic string with an earth fault after the voltage disturbance and by using a quantity N of photovoltaic panels that are included in the photovoltaic string and that are connected in series.

The controller may be configured to: when the terminal voltage is the voltage to earth of the positive electrode, obtain the photovoltaic panel with an earth fault according to the following formula:

$$x=N*(Upv+/Upv); \text{ or}$$

when the terminal voltage is the voltage to earth of the negative electrode, obtain the photovoltaic panel with an earth fault according to the following formula:

$$x=N*(1-|Upv-|/Upv), \text{ where}$$

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

An embodiment may further provide a method for detecting an earth fault of a photovoltaic string, including: obtaining a terminal voltage of each photovoltaic string before voltage disturbance, where the terminal voltage is a voltage to earth of a positive electrode or negative electrode of the photovoltaic string; performing voltage disturbance on each photovoltaic string, and obtaining a terminal voltage of each photovoltaic string after the voltage disturbance; determining a photovoltaic string with an earth fault based on the terminal voltage of each photovoltaic string before the voltage disturbance and the terminal voltage of each photovoltaic string after the voltage disturbance; and for the photovoltaic string with an earth fault, obtaining a photovoltaic panel with an earth fault by using the terminal voltage and an output voltage of the photovoltaic string before the voltage disturbance, or obtaining a photovoltaic panel with an earth fault by using the terminal voltage and an output voltage of the photovoltaic string after the voltage disturbance.

When the terminal voltage before the voltage disturbance and the terminal voltage after the voltage disturbance vary obviously, it indicates that an earth fault occurs in the photovoltaic string. All photovoltaic panels in a photovoltaic string are connected in series. When a short circuit to earth occurs at a point in the photovoltaic string, an electrical potential of a location at which an earth fault occurs is a reference ground. Therefore, a reference potential of a terminal voltage of the photovoltaic string is a ground potential at the location at which the earth fault occurs, and a location at which the earth fault occurs may be determined by using a proportion between the terminal voltage and an output voltage of the entire string. The method is simple and easy to implement, and does not require any additional hardware device. A photovoltaic panel with an earth fault can be automatically determined without the need for manually performing detection on N photovoltaic panels of a photovoltaic string one by one, thereby achieving high detection efficiency.

Determining a photovoltaic string with an earth fault based on the terminal voltage of each photovoltaic string before the voltage disturbance and the terminal voltage of each photovoltaic string after the voltage disturbance may include: when an absolute value of a difference between the terminal voltage of the photovoltaic string before the voltage disturbance and the terminal voltage of the photovoltaic string after the voltage disturbance exceeds a preset threshold, determining that the photovoltaic string is a photovoltaic string with an earth fault.

Performing the voltage disturbance on each photovoltaic string may include: controlling an output voltage of a voltage-disturbed photovoltaic string to change along a voltage increasing direction or change along a voltage decreasing direction.

Controlling an output voltage of a voltage-disturbed photovoltaic string to change along a voltage decreasing direction may include: controlling the output voltage of the voltage-disturbed photovoltaic string to change from an open-circuit voltage before the voltage disturbance to a first preset voltage after the voltage disturbance, where the first preset voltage is less than the open-circuit voltage.

The voltage disturbance may change a voltage in an increasing direction or may change a voltage in a decreasing direction. The performing voltage disturbance on each photovoltaic string may be controlling an open-circuit voltage to change to a short-circuit voltage during a current and voltage scan, namely changing a voltage from a large value to a small value, and may include: controlling the output voltage of the voltage-disturbed photovoltaic string to change from an open-circuit voltage before the voltage disturbance to a short-circuit voltage after the voltage disturbance.

Photovoltaic panels in a photovoltaic string may be connected in series and the photovoltaic panels connected in series may perform voltage division on voltages at two ends of the photovoltaic string. Therefore, a location of an earth fault may be obtained by using a proportion. Obtaining a photovoltaic panel with an earth fault by using the terminal voltage and an output voltage of the photovoltaic string before the voltage disturbance may include: obtaining the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series.

Obtaining the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series may include: when the terminal voltage is the voltage to earth of the positive electrode, obtaining the photovoltaic panel with an earth fault according to the following formula:

$$x=N*(Upv+/Upv); \text{ or}$$

when the terminal voltage is the voltage to earth of the negative electrode, obtain the photovoltaic panel with an earth fault according to the following formula:

$$x=N*(1-|Upv-|/Upv), \text{ where}$$

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

Obtaining a photovoltaic panel with an earth fault by using the terminal voltage and an output voltage of the photovoltaic string after the voltage disturbance may include: obtaining the photovoltaic panel with an earth fault by using a proportion between the terminal voltage and the output voltage of the photovoltaic string with an earth fault after the voltage disturbance and by using a quantity N of photovoltaic panels that are included in the photovoltaic string and that are connected in series.

Obtaining the photovoltaic panel with an earth fault by using a proportion between the terminal voltage and the output voltage of the photovoltaic string with an earth fault after the voltage disturbance and by using a quantity N of photovoltaic panels that are included in the photovoltaic string and that are connected in series may include:
when the terminal voltage is the voltage to earth of the positive electrode, obtaining the photovoltaic panel with an earth fault according to the following formula:

$$x=N*(Upv+/Upv); \text{ or}$$

when the terminal voltage is the voltage to earth of the negative electrode, obtain the photovoltaic panel with an earth fault according to the following formula:

$$x=N*(1-|Upv-|/Upv), \text{ where}$$

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

An embodiment may further provide a photovoltaic device for detecting an earth fault, including a power conversion circuit, a controller, and a voltage detection circuit. The power conversion circuit and a photovoltaic string are in a one-to-one correspondence, and each photovoltaic string is connected to a corresponding power conversion circuit. The voltage detection circuit is configured to obtain a terminal voltage of each photovoltaic string before voltage disturbance, where the terminal voltage is a voltage to earth of a positive electrode or negative electrode of the photovoltaic string. The controller is configured to perform voltage disturbance on each photovoltaic string. The voltage detection circuit is further configured to obtain a terminal voltage of each photovoltaic string after the voltage disturbance. The controller is further configured to determine a photovoltaic string with an earth fault based on the terminal voltage of each photovoltaic string before the voltage disturbance and the terminal voltage of each photovoltaic string after the voltage disturbance; and for the photovoltaic string with an earth fault, obtain a photovoltaic panel with an earth fault by using the terminal voltage and an output voltage of the photovoltaic string before the voltage disturbance, or obtain a photovoltaic panel with an earth fault by using the terminal voltage and an output voltage of the photovoltaic string after the voltage disturbance.

The controller may be configured to: when an absolute value of a difference between the terminal voltage of the photovoltaic string before the voltage disturbance and the terminal voltage of the photovoltaic string after the voltage disturbance exceeds a preset threshold, determine that the photovoltaic string is a photovoltaic string with an earth fault.

A voltage disturbance direction may not be limited in this embodiment. For example, the controller controls an output voltage of a voltage-disturbed photovoltaic string to change along a voltage increasing direction or change along a voltage decreasing direction.

The controller may control the output voltage of the voltage-disturbed photovoltaic string to change from an open-circuit voltage before the voltage disturbance to a first preset voltage after the voltage disturbance, where the first preset voltage is less than the open-circuit voltage. A preset voltage may be set and the output voltage may be changed to the preset voltage through disturbance.

The controller may obtain the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series.

According to the foregoing solutions, the embodiments may have the following advantages:

An output voltage of a photovoltaic string is disturbed. In other words, the output voltage of the photovoltaic string is controlled to change. Whether an earth fault occurs in the photovoltaic string is determined by using a terminal voltage of the photovoltaic string before the change and a terminal voltage of the photovoltaic string after the change. The terminal voltage of the photovoltaic string is a voltage to earth of a positive electrode or negative electrode of the photovoltaic string. When an earth fault occurs in the photovoltaic string, a terminal voltage of the photovoltaic string after the voltage disturbance varies obviously from that before the voltage disturbance. When the terminal voltage before the voltage disturbance and the terminal voltage after the voltage disturbance vary obviously, it indicates that an earth fault occurs in the photovoltaic string. All photovoltaic panels in a photovoltaic string are connected in series. When a short circuit to earth occurs at a point in the photovoltaic string, an electrical potential of a location at which an earth fault occurs is a reference ground. Therefore, a reference potential of a terminal voltage of the photovoltaic string is a ground potential at the location at which the earth fault occurs, and a location at which the earth fault occurs may be determined by using a proportion between the terminal voltage and an output voltage of the entire string. The method is simple and easy to implement and does not require any additional hardware device. A photovoltaic panel with an earth fault can be automatically determined without the need for manually performing detection on N photovoltaic panels of a photovoltaic string one by one, thereby achieving high detection efficiency.

DETAILED DESCRIPTION OF THE EMBODIMENTS

To make persons skilled in the art better understand the embodiments, the following uses a single photovoltaic string as an example to describe a working status when an earth fault occurs, and analyzes, with reference to the earth fault, a working principle on which the embodiments are based.

First, an earth fault is described. As stipulated by a standard, an inverter is not allowed to be powered when a direct current insulation resistance is low (which cannot meet a leakage current requirement). In the embodiments, an earth fault means that a direct current insulation resistance is lower than a corresponding resistance at which an inverter is allowed to power on according to the standard. For example, a fault of short circuit to earth is a special case of the earth fault.

Method Embodiment 1

Figure 1:
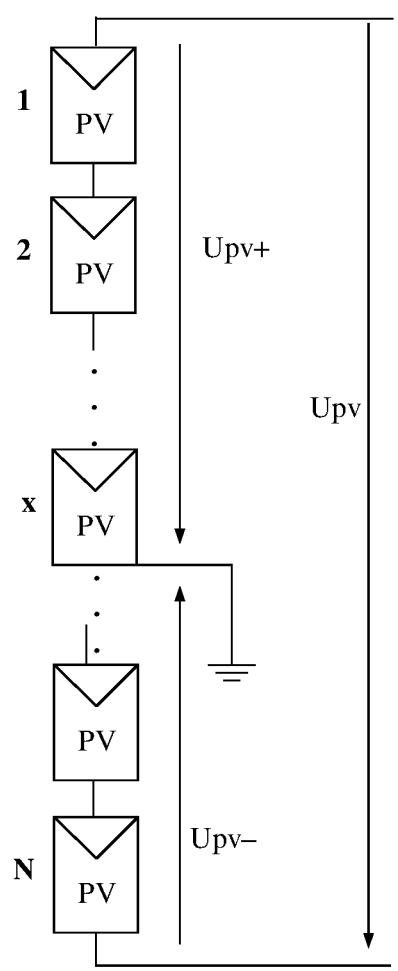
FIG. 1 is a schematic diagram of an earth fault of a single photovoltaic string according to an embodiment.

FIG. 1 is a schematic diagram of an earth fault of a single photovoltaic string according to this embodiment.

The photovoltaic string shown in FIG. 1 includes N photovoltaic panels that are connected in series, including photovoltaic panels 1, 2, ..., x, ..., N−1, and N. A positive electrode of the photovoltaic string is PV+, and a negative electrode of the photovoltaic string is PV−. N is an integer greater than or equal to 2.

Figure 2:
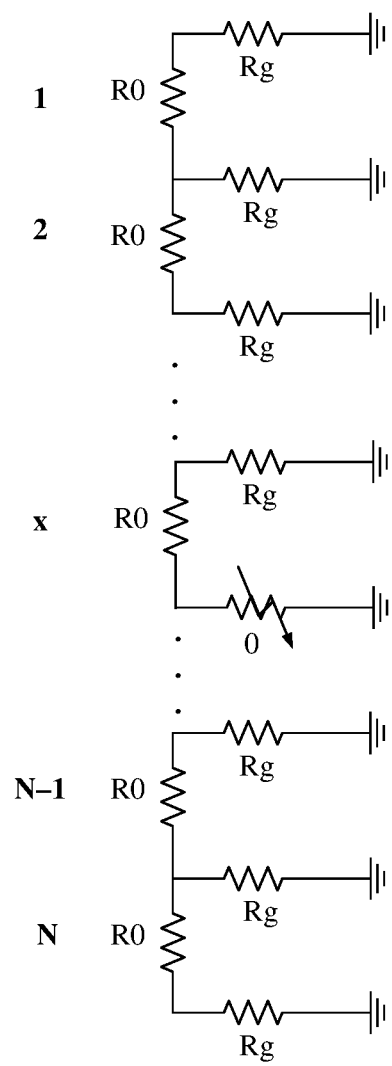
FIG. 2 is a schematic diagram of a resistance model corresponding to FIG. 1.

For a resistance model corresponding to FIG. 1, refer to FIG. 2.

When the photovoltaic string does not have an earth fault, a resistance value of an internal resistor R0 of a photovoltaic panel is far less than a resistance to earth Rg of the photovoltaic panel.

When an earth fault (most likely a fault with a low insulation resistance to earth) occurs on a photovoltaic panel in the photovoltaic string, a resistance to earth Rg of the photovoltaic panel changes to a small resistance close to 0. In this case, a proportional relationship exists between Upv and a voltage to earth Upv+ of PV+ as well as a voltage to earth Upv− of PV−, where Upv is a voltage between the positive electrode and the negative electrode of the photovoltaic string, and Upv+−Upv−=Upv.

The N photovoltaic panels are connected in series. When an earth fault occurs on a photovoltaic panel, an electrical potential of the photovoltaic panel with an earth fault approximates a reference zero potential. Therefore, a serial number of the photovoltaic panel at a fault location may be calculated according to the following formula:

$$x=N*(1-|Upv-|/Upv), \text{ or } x=N*(Upv+/Upv).$$

To make persons skilled in the art more thoroughly understand the solutions provided in this embodiment, the following description is provided by using an example in which an earth fault occurs in one of two photovoltaic strings.

Figure 3:
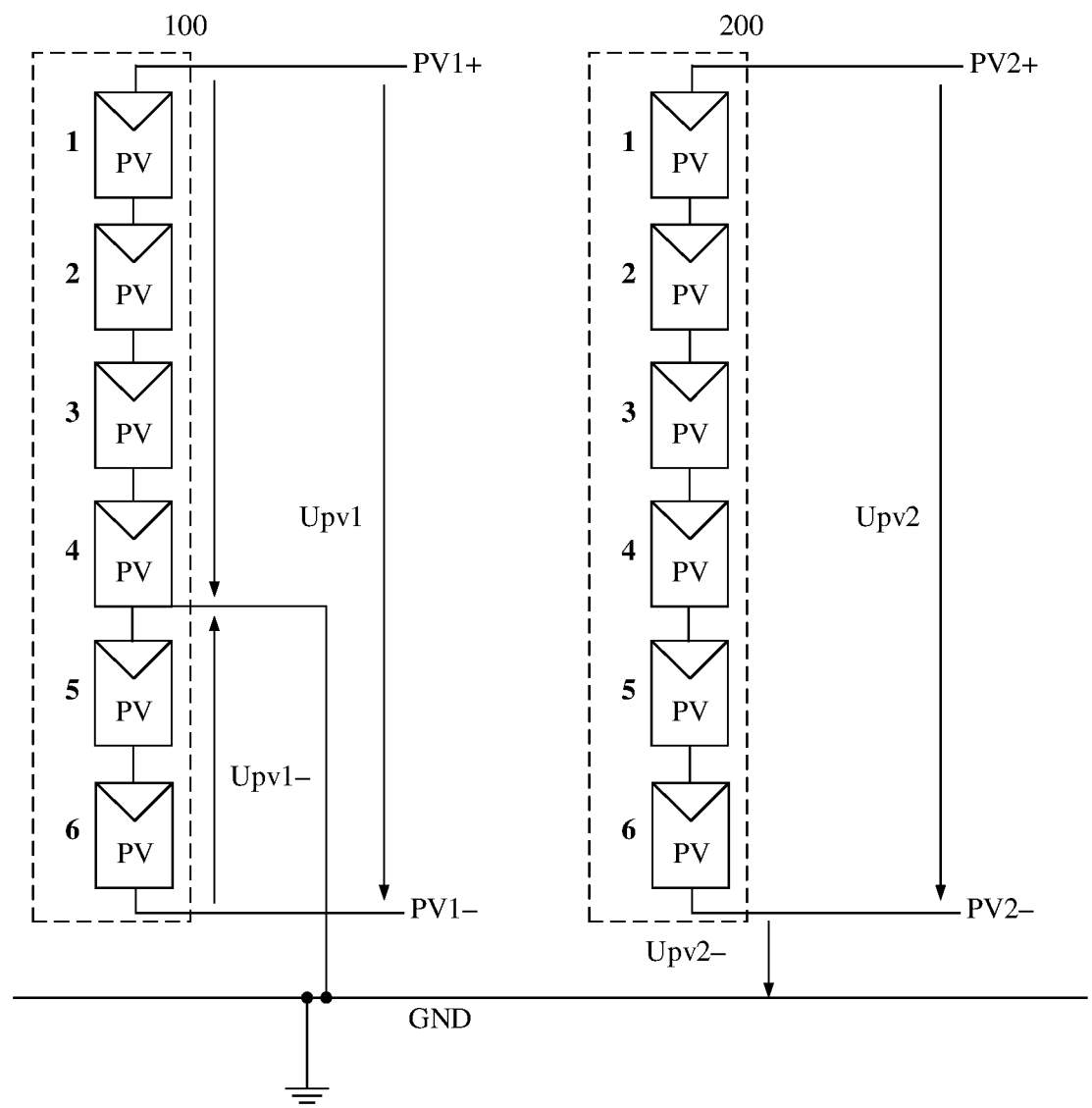
FIG. 3 is a schematic diagram of two photovoltaic strings according to an embodiment.

FIG. 3 is a schematic diagram of two photovoltaic strings according to this embodiment.

Each photovoltaic string includes six photovoltaic panels that are connected in series. As shown in FIG. 3, a first photovoltaic string 100 includes photovoltaic panels 1 to 6, and a second photovoltaic string 200 includes photovoltaic panels 1 to 6. The first photovoltaic string 100 and the second photovoltaic string 200 are in a same photovoltaic power generation system and have a same reference ground. However, a positive electrode and a negative electrode of the first photovoltaic string 100 are independent of those of the second photovoltaic string 200. In other words, PV1+ and PV2+ are not connected together, and PV1- and PV2- are not connected together.

An earth fault occurs on the fourth photovoltaic panel 4 of the first photovoltaic string 100. No earth fault occurs in the second photovoltaic string 200.

In this case, a voltage to earth of PV1- is obtained through voltage division by internal resistors R0 of photovoltaic panels. In other words, |Upv1-|/Upv1=2/6=1/3.

A voltage to earth of the second photovoltaic string 200 is still determined by a resistance to earth Rg of the second photovoltaic string 200. In this case, if Upv2 remains unchanged, and a voltage value of Upv1 changes, a voltage to earth of the first photovoltaic string 100 changes accordingly, and a value of Upv1-=-⅓Upv1. For example, when Upv1=0, the voltage to earth of the first photovoltaic string 100 also changes to 0 V. If Upv1 remains unchanged but Upv2 is changed, a voltage of Upv1- is still in a proportional relationship with Upv1.

Therefore, to accurately determine a photovoltaic panel with an earth fault in a photovoltaic string, in this embodiment, a voltage of a photovoltaic string in a photovoltaic power generation system is disturbed, voltages to earth (namely terminal voltages) of the photovoltaic string are sampled, and terminal voltages before and after the disturbance are compared, to determine whether an earth fault occurs in the photovoltaic string. When it is determined that an earth fault occurs in the photovoltaic string, a fault location is further obtained based on a proportional relationship between a voltage to earth of PV+ or a voltage to earth of PV- and a voltage of PV.

For ease of understanding, the following first describes determining of an earth fault of one photovoltaic string. The photovoltaic string is connected to an input terminal of a direct current/direct current (DC/DC) conversion circuit, and an output terminal of the DC/DC conversion circuit is configured to connect to an inverter circuit. The DC/DC conversion circuit and the inverter circuit may be integrated into an inverter, and a controller of the inverter is used to detect an earth fault of the photovoltaic string. Alternatively, a controller may be disposed independently to detect an earth fault of the photovoltaic string. There may be no DC/DC circuit in the inverter, and there is only a DC/AC conversion circuit. The inverter may be a single-phase inverter, or may be a three-phase inverter. This is not limited in this embodiment.

The following uses a three-phase inverter as an example for description. An output terminal of the inverter may output three-phase alternating currents, which are respectively L1, L2, and L3.

Figure 4:
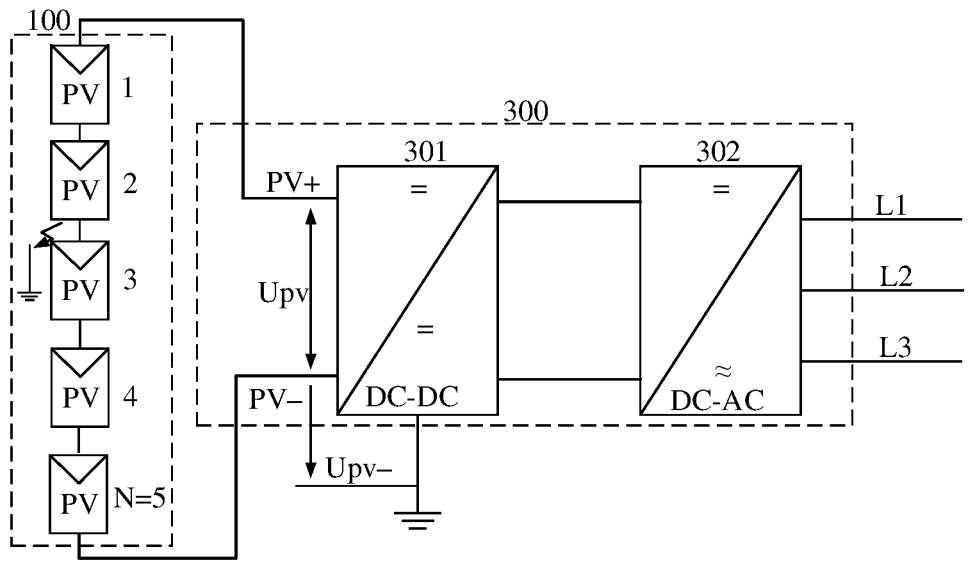
FIG. 4 is a schematic diagram of a photovoltaic power generation system corresponding to a single photovoltaic string according to an embodiment.

FIG. 4 is a schematic diagram of a photovoltaic power generation system corresponding to a single photovoltaic string according to this embodiment.

In this embodiment, a single photovoltaic string is used as an example for description. A photovoltaic string 100 may be connected to an input terminal of an inverter 300. PV+ may be connected to a positive input terminal of a DC/DC conversion circuit 301, PV- may be connected to a negative input terminal of the DC/DC conversion circuit 301, the DC/DC conversion circuit 301 may be connected to an input terminal of an inverter circuit 302, and an output terminal of the inverter circuit 302 may be connected to an alternating current power grid.

The photovoltaic string includes N photovoltaic panels that are connected in series. In FIG. 4, an example in which N=5 is merely used for description. For example, an earth fault occurs on the second of the five photovoltaic panels. The photovoltaic panels are numbered starting from an end close to the positive electrode PV+ of the photovoltaic string 100. A photovoltaic panel connected to PV+ may be the first photovoltaic panel and a photovoltaic panel connected to PV- may be the fifth photovoltaic panel. N may be greater than or equal to 2. In other words, one photovoltaic string includes at least two photovoltaic panels that are connected in series. An earth fault may occur at any location in the photovoltaic string. In this embodiment, as an example for description, an earth fault may occur only at one location in one photovoltaic string.

Implementations of the DC/DC conversion circuit 301 and the inverter circuit 302 are not limited in this embodiment. For example, the DC/DC conversion circuit 301 may be a boost circuit, a buck circuit, or a buck-boost circuit. Alternatively, there may be no DC/DC circuit, and the photovoltaic string is directly connected to the DC/AC circuit. Likewise, a topology form of the inverter circuit 302 is not limited in this embodiment.

A method for detecting an earth fault of a photovoltaic string provided in this embodiment may be applied to a controller of the inverter 300, or may be applied to another controller, for example, a controller of a photovoltaic power station.

Figure 5:
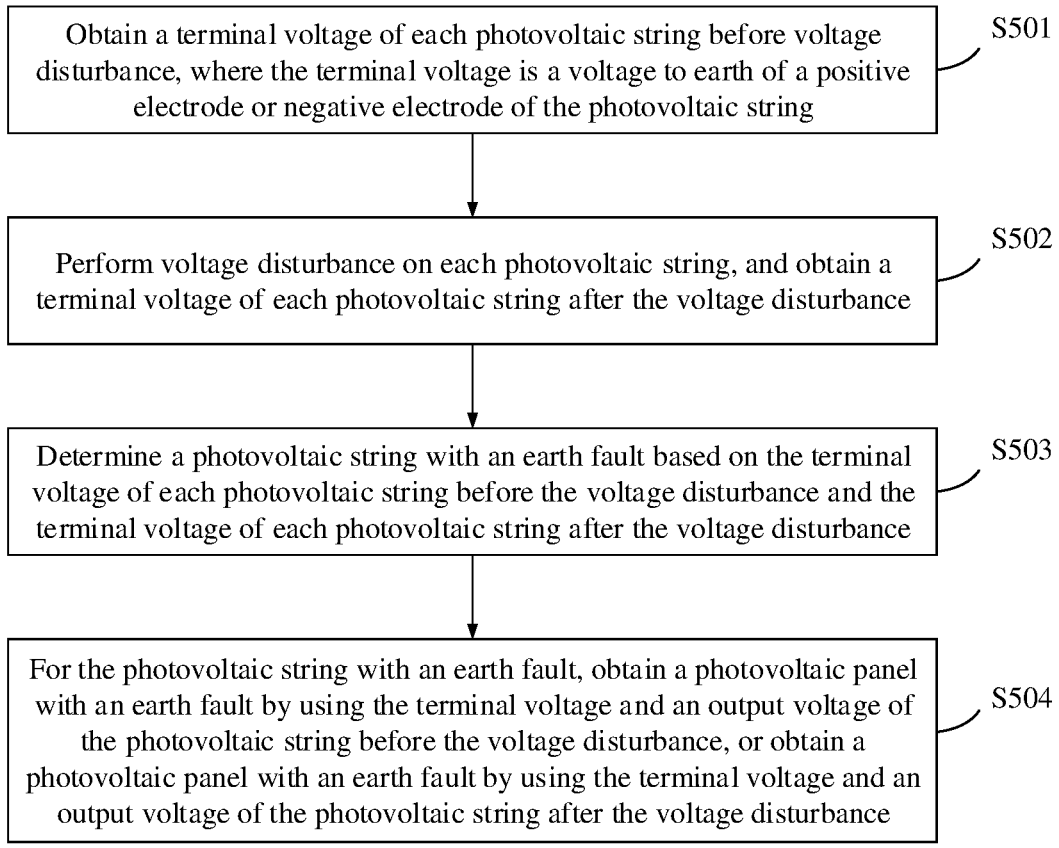
FIG. 5 is a flowchart of a method for detecting an earth fault of a photovoltaic string according to an embodiment.

FIG. 5 is a flowchart of a method for detecting an earth fault of a photovoltaic string according to this embodiment.

The method includes the following steps.

S501: Obtain a terminal voltage of each photovoltaic string before voltage disturbance, where the terminal voltage is a voltage to earth of a positive electrode or negative electrode of the photovoltaic string.

For the photovoltaic string shown in FIG. 4, obtaining a terminal voltage before voltage disturbance, that is, a voltage to earth of PV+ or a voltage to earth of PV- before disturbance, is obtained.

In an implementation, a simplest control manner before voltage disturbance is not to perform any control on a photovoltaic string. When an output voltage of a photovoltaic string is not controlled, an output voltage of the photovoltaic string may be an open-circuit voltage of the photovoltaic string.

S502: Perform voltage disturbance on each photovoltaic string and obtain a terminal voltage of each photovoltaic string after the voltage disturbance.

As shown in FIG. 4, only one photovoltaic string is included. In this case, an output voltage of the photovoltaic string 100 may be controlled by controlling an input voltage of the DC/DC conversion circuit 301, which may be implemented by the controller of the inverter 300 or may be implemented by another control apparatus. This is not limited in this embodiment.

A plurality of voltage disturbance manners may be available. For example, the output voltage of the photovoltaic string 100 is controlled to change from a large value to a small value, or the output voltage of the photovoltaic string 100 is controlled to change from a small value to a large value, or is controlled to change from an open-circuit voltage to a short-circuit voltage. Control may be implemented through scanning along a current-voltage IV curve of the photovoltaic string, so that the photovoltaic string 100 works at a point of the curve.

For example, controlling an output voltage of a voltage-disturbed photovoltaic string to change along a voltage decreasing direction may include:

controlling the output voltage of the voltage-disturbed photovoltaic string to change from an open-circuit voltage before the voltage disturbance to a first preset voltage after the voltage disturbance, where the first preset voltage is less than the open-circuit voltage.

The first preset voltage may be a voltage that corresponds to any working point and that is less than the open-circuit voltage.

S503: Determine a photovoltaic string with an earth fault based on the terminal voltage of each photovoltaic string before the voltage disturbance and the terminal voltage of each photovoltaic string after the voltage disturbance.

When an earth fault occurs on a photovoltaic panel in the photovoltaic string 100, a voltage to earth Upv+ of the positive electrode PV+ of the photovoltaic string 100 before the disturbance is obviously different from that after the disturbance. Similarly, a voltage to earth Upv− of the negative electrode PV− of the photovoltaic string 100 before the disturbance is also obviously different from that after the disturbance.

For whether an earth fault occurs in the photovoltaic string 100, whether a short-circuit fault occurs may be determined based on a difference between Upv+ before the voltage disturbance and Upv+ after the voltage disturbance, or whether a short-circuit fault occurs may be determined based on a difference between Upv− before the voltage disturbance and Upv− after the voltage disturbance.

For example, when an absolute value of a difference between the terminal voltage of the photovoltaic string before the voltage disturbance and the terminal voltage of the photovoltaic string after the voltage disturbance exceeds a preset threshold, it is determined that the photovoltaic string is a photovoltaic string with an earth fault.

The preset threshold may be set according to an actual application scenario, and a value may not be limited in this embodiment.

The following uses three control manners as examples for description.

First manner: Control an output voltage of a photovoltaic string to change from a large value to a small value.

Voltage disturbance is performed between an open-circuit voltage and a short-circuit voltage, to control the output voltage of the photovoltaic string to change to a short-circuit voltage point by 300 V, so as to determine a jump of a terminal voltage. For example, the output voltage of the photovoltaic string is first controlled to be 600 V, and a sampled terminal voltage is Upv1. Voltage disturbance is performed to control the output voltage of the photovoltaic string to be 300 V. In other words, the voltage is decreased by 300 V. In this case, a sampled terminal voltage is Upv2. A difference between Upv2 and Upv1 is obtained. The output voltage of the photovoltaic string is decreased. Therefore, Upv2 is less than Upv1, and a value of Upv2−Upv1 is negative. Therefore, when an absolute value of the difference between Upv2 and Upv1 is greater than the preset threshold, it is determined that an earth fault occurs in the photovoltaic string.

It should be noted that Upv1 and Upv2 may be voltages to earth of a positive electrode, or may be voltages to earth of a negative electrode.

Second manner: Control an output voltage of a photovoltaic string to change from a small value to a large value.

The output voltage of the photovoltaic string is controlled to jump to an open-circuit voltage. For example, the output voltage of the photovoltaic string is first controlled to be 600 V, and a sampled terminal voltage is Upv1. Voltage disturbance is performed to control the output voltage of the photovoltaic string to be 900 V. In other words, the voltage is increased by 300 V. In this case, a sampled terminal voltage is Upv2. A difference between Upv2 and Upv1 is obtained. The output voltage of the photovoltaic string is increased. Therefore, Upv2 is greater than Upv1, and a value of Upv2−Upv1 is positive. When the difference between Upv2 and Upv1 is greater than the preset threshold, it is determined that an earth fault occurs in the photovoltaic string.

Third manner: Control an output voltage of a photovoltaic string to change from an open-circuit voltage to a short-circuit voltage.

Voltage disturbance is performed to control the output voltage of the photovoltaic string to change from the open-circuit voltage to the short-circuit voltage. In other words, the short-circuit voltage after the voltage disturbance is 0, namely the output voltage changes from a large value to 0. A sampled terminal voltage is also close to 0. In this case, it is determined that the photovoltaic string has an earth fault.

S504: For the photovoltaic string with an earth fault, obtain a photovoltaic panel with an earth fault by using the terminal voltage and an output voltage of the photovoltaic string before the voltage disturbance, or obtain a photovoltaic panel with an earth fault by using the terminal voltage and an output voltage of the photovoltaic string after the voltage disturbance.

For one photovoltaic string, when an earth fault occurs at only one location, a proportional relationship exists between a terminal voltage of the photovoltaic string and an output voltage of the photovoltaic string. Therefore, a location of a photovoltaic panel with an earth fault in the photovoltaic string may be obtained by using the proportional relationship between the terminal voltage and the output voltage of the photovoltaic string.

A proportion between the terminal voltage and the output voltage of the photovoltaic string may be calculated by using a proportion between a terminal voltage and the output voltage of the photovoltaic string before the voltage disturbance or may be calculated by using a proportion between a terminal voltage and the output voltage of the photovoltaic string after the disturbance.

For example, in FIG. 4, the five photovoltaic panels are connected in series between PV+ and PV−. Therefore, assuming that an earth fault occurs on the second photovoltaic panel, when it is detected, regardless of whether before the voltage disturbance or after the voltage disturbance, that a proportion between an absolute value of Upv+ and Upv is ⅖ or that a proportion between an absolute value of Upv− and Upv is ⅗, it indicates that an earth fault occurs on the second photovoltaic panel. It should be noted that the second photovoltaic panel herein is the second photovoltaic panel counted from the PV+ end. In addition, in some photovoltaic arrays, when a quantity of photovoltaic panels included in each photovoltaic string is unknown, N and x herein represent percentages. N may represent 100% and x may represent a distance, in percentage, to PV+ from a location at which a fault occurs in the photovoltaic string. For example, if x=20%, it indicates that an earth fault occurs at a location of approximately 20%. To locate an earth fault more accurately, avoid voltage sampling near a short-circuit point as far as possible.

For example, the photovoltaic panel with an earth fault is obtained by using a proportion between Upv+ before the voltage disturbance and Upv before the voltage disturbance.

It should be noted that the foregoing describes only an implementation. A location of an earth fault can be determined provided that a proportional relationship exists between a terminal voltage and an output voltage of an entire string. The foregoing proportion is not necessarily exactly ⅖. Sampling data may be different from the data of an actual working environment. Therefore, even if a slight deviation occurs, a corresponding photovoltaic panel with an earth faulty can still be determined provided that the deviation is within a preset deviation range.

It should be noted that an earth fault of a photovoltaic panel not only means that a short circuit to earth occurs on the photovoltaic panel but may also be a short circuit to earth caused by an insulation damage to a cable connected in series before or after the photovoltaic panel.

According to the method provided in this embodiment, an output voltage of a photovoltaic string is disturbed. In other words, the output voltage of the photovoltaic string is controlled to change. Whether an earth fault occurs in the photovoltaic string is determined by using a terminal voltage of the photovoltaic string before the change and a terminal voltage of the photovoltaic string after the change. When the terminal voltage before the voltage disturbance and the terminal voltage after the voltage disturbance vary obviously, it indicates that an earth fault occurs in the photovoltaic string. All photovoltaic panels in the photovoltaic string are connected in series. When an earth fault occurs at a location in the photovoltaic string, an electrical potential at the location of the earth fault is approximately equal to a reference ground. In this case, a voltage allocated to all photovoltaic panels from one end of the photovoltaic string to the fault location may be considered as a terminal voltage. Therefore, the location at which the earth fault occurs may be determined by using a proportion between the terminal voltage and an output voltage of the entire string. The method is simple and easy to implement, and does not require any additional hardware device. A photovoltaic panel with an earth fault can be automatically determined without the need for manually performing detection on N photovoltaic panels of a photovoltaic string one by one, thereby improving efficiency.

Method Embodiment 2

The foregoing embodiment is described by using an example in which an inverter corresponds to one photovoltaic string. In the following description, one inverter corresponds to a plurality of photovoltaic strings, and each photovoltaic string corresponds to a respective DC/DC conversion circuit. In other words, the photovoltaic strings are in a one-to-one correspondence with the DC/DC conversion circuits. In addition, the DC/DC conversion circuits are independent of each other, and positive input terminals or negative input terminals are not short-circuited together. The photovoltaic strings are independent of each other and are respectively connected to the corresponding DC/DC conversion circuits. Therefore, input control and sampling of a photovoltaic string do not affect those of another, and voltage disturbance may be performed independently on each photovoltaic string. In other words, voltage disturbance may be performed simultaneously, or voltage disturbance may be performed in a time-division manner. This is not limited in this embodiment.

Figure 6:
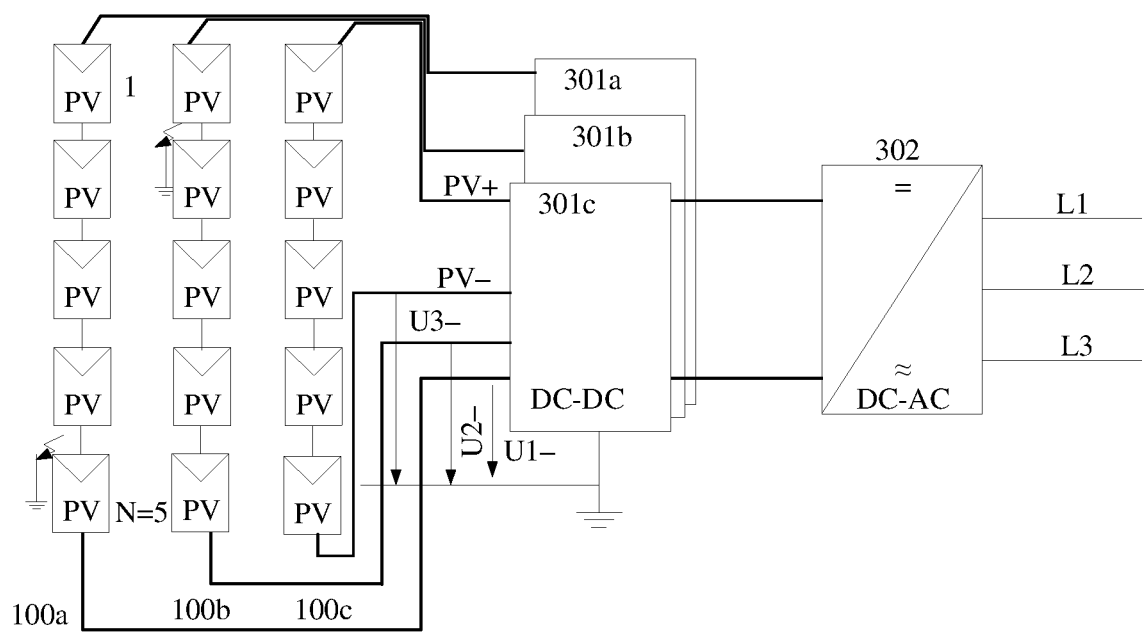
FIG. 6 is a schematic diagram of a photovoltaic power generation system corresponding to a plurality of photovoltaic strings according to an embodiment.

FIG. 6 is a schematic diagram of a photovoltaic power generation system corresponding to a plurality of photovoltaic strings according to an embodiment.

In this embodiment, three photovoltaic strings are used as an example for description, and are respectively a first photovoltaic string 100a, a second photovoltaic string 100b, and a third photovoltaic string 100c. Both the first photovoltaic string 100a and the second photovoltaic string 100b have an earth fault. In addition, each of the three photovoltaic strings includes five photovoltaic panels that are connected in series, which are respectively the first to the fifth photovoltaic panels in sequence from PV+ to PV−.

The first photovoltaic string 100a is connected to an input terminal of a first DC/DC conversion circuit 301a.

The second photovoltaic string 100b is connected to an input terminal of a second DC/DC conversion circuit 301b.

The third photovoltaic string 100c is connected to an input terminal of a third DC/DC conversion circuit 301c.

Output terminals of the first DC/DC conversion circuit 301a, the second DC/DC conversion circuit 301b, and the third DC/DC conversion circuit 301c are all connected to an input terminal of an inverter circuit 302. The output terminals of the first DC/DC conversion circuit 301a, the second DC/DC conversion circuit 301b, and the third DC/DC conversion circuit 301c may be connected in parallel to a same bus.

The first DC/DC conversion circuit 301a, the second DC/DC conversion circuit 301b, the third DC/DC conversion circuit 301c, and the inverter circuit 302 may be integrated into an inverter.

An earth fault occurs on the fourth photovoltaic panel in the first photovoltaic string 100a, and an earth fault occurs on the first photovoltaic panel in the second photovoltaic string 100b.

For an implementation of determining the first photovoltaic string 100a and the second photovoltaic string 100b, the manner described in Method Embodiment 1 may be used, and details are not described herein again. For example, whether an earth fault occurs may be determined by detecting Upv+ before and after voltage disturbance, or whether an earth fault occurs may be determined by detecting Upv− before and after voltage disturbance.

Obtaining a photovoltaic panel with an earth fault by using a terminal voltage and an output voltage of the photovoltaic string before voltage disturbance may include:

obtaining the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series.

When it is determined that an earth fault occurs in the first photovoltaic string 100a and the second photovoltaic string 100b, a location at which the earth fault occurs is determined by using a proportion between a terminal voltage of the first photovoltaic string 100a before disturbance and an output voltage of the first photovoltaic string 100a before the disturbance and on a basis that N=5. Likewise, a location at which the earth fault occurs is determined by using a proportion between a terminal voltage of the second photovoltaic string 100b before disturbance and an output voltage of the second photovoltaic string 100b before the voltage disturbance and on a basis that N=5.

Figure 7:
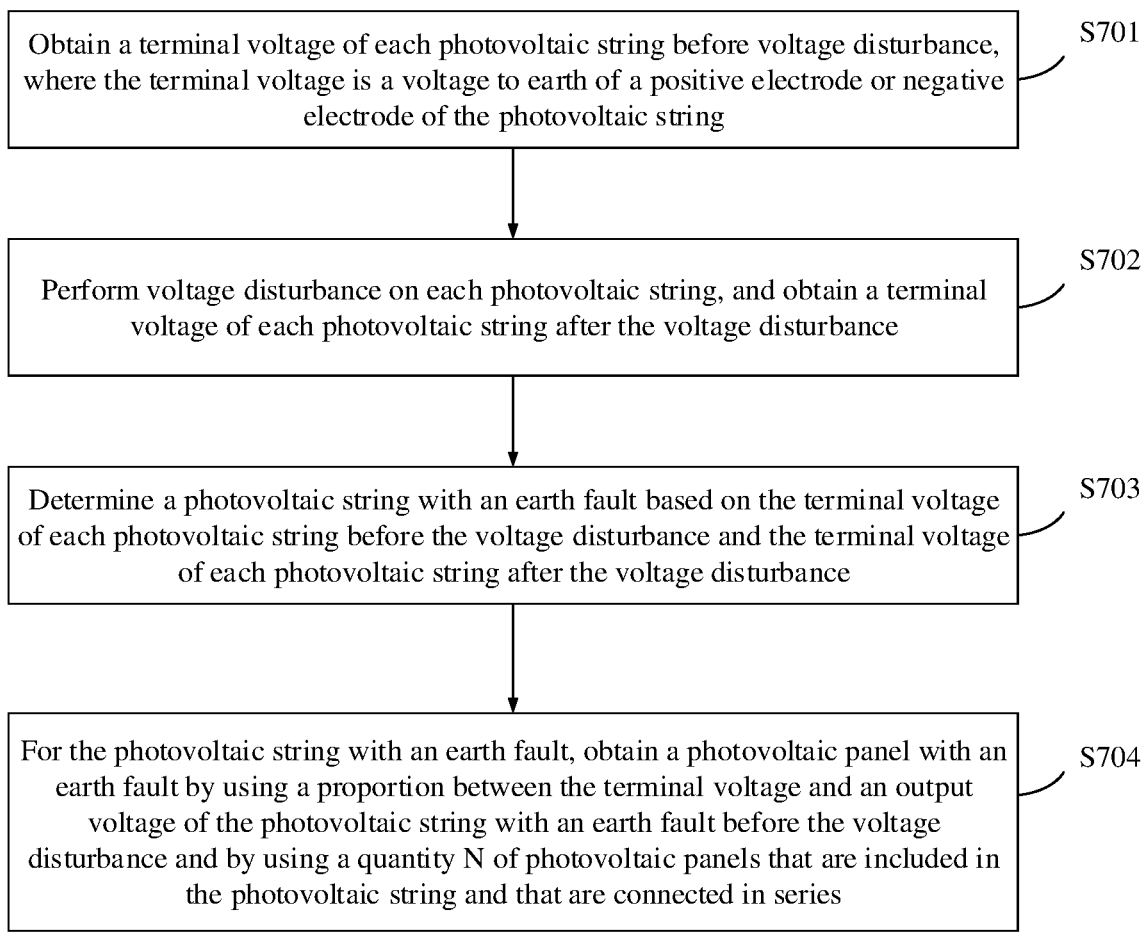
FIG. 7 is a flowchart of another method for detecting an earth fault of a photovoltaic string according to an embodiment.

FIG. 7 is a flowchart of another method for detecting an earth fault of a photovoltaic string according to this embodiment.

S701 to S703 are respectively the same as S501 to S503, and details are not described herein again.

S704: For the photovoltaic string with an earth fault, obtain a photovoltaic panel with an earth fault by using a proportion between the terminal voltage and an output voltage of the photovoltaic string with an earth fault before the voltage disturbance and by using a quantity N of photovoltaic panels that are included in the photovoltaic string and that are connected in series. The step may include:

when the terminal voltage is the voltage to earth of the positive electrode, obtaining the photovoltaic panel with an earth fault according to the following formula:

$$x=N^*(Upv+/Upv); \text{ or}$$

when the terminal voltage is the voltage to earth of the negative electrode, obtain the photovoltaic panel with an earth fault according to the following formula:

$$x=N^*(1-|Upv-|/Upv), \text{ where}$$

Upv+ represents the voltage to earth of the positive electrode before the voltage disturbance, Upv– represents the voltage to earth of the negative electrode before the voltage disturbance, Upv represents the output voltage before the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

The foregoing formulas are based on a principle that the N photovoltaic panels are connected in series. When the $x^{th}$ photovoltaic panel is short-circuited to earth, Upv+/Upv of the photovoltaic string is x/N. Both Upv+ and Upv can be obtained by using a voltage detection circuit, and N is a known number. Therefore, x can be obtained, and x is a serial number of a photovoltaic panel on which an earth fault occurs. Similarly, the photovoltaic panel with an earth fault may alternatively be obtained by using the voltage to earth of the negative electrode of and the output voltage of the photovoltaic string before the disturbance. When the $x^{th}$ photovoltaic panel is short-circuited to earth, (1−|Upv−|/Upv) of the photovoltaic string is x/N. Both Upv− and Upv may be obtained by using the voltage detection circuit and N may be a known number. Therefore, x can be obtained.

For example, before the voltage disturbance, an open-circuit voltage U1 of the first photovoltaic string 100a in an open circuit and an open-circuit voltage U2 of the second photovoltaic string 100b in an open circuit are separately collected. Before the voltage disturbance, a voltage to earth U1− of PV− when the first photovoltaic string 100a is in an open circuit and a voltage to earth U2− of PV− when the second photovoltaic string 100b is in an open circuit are separately collected.

In this case, the photovoltaic panel x1 with an earth fault in the first photovoltaic string 100a=(1−|U1−|/U1)*N; and the photovoltaic panel x2 with an earth fault in the second photovoltaic string 100b=(1−|U2−|/U2)*N.

FIG. 7 describes how to determine a location of an earth fault by using a proportion between a terminal voltage before disturbance and an output voltage before the disturbance. The following describes how to determine a location of an earth fault by using a proportion between a terminal voltage after disturbance and an output voltage after the disturbance.

Figure 8:
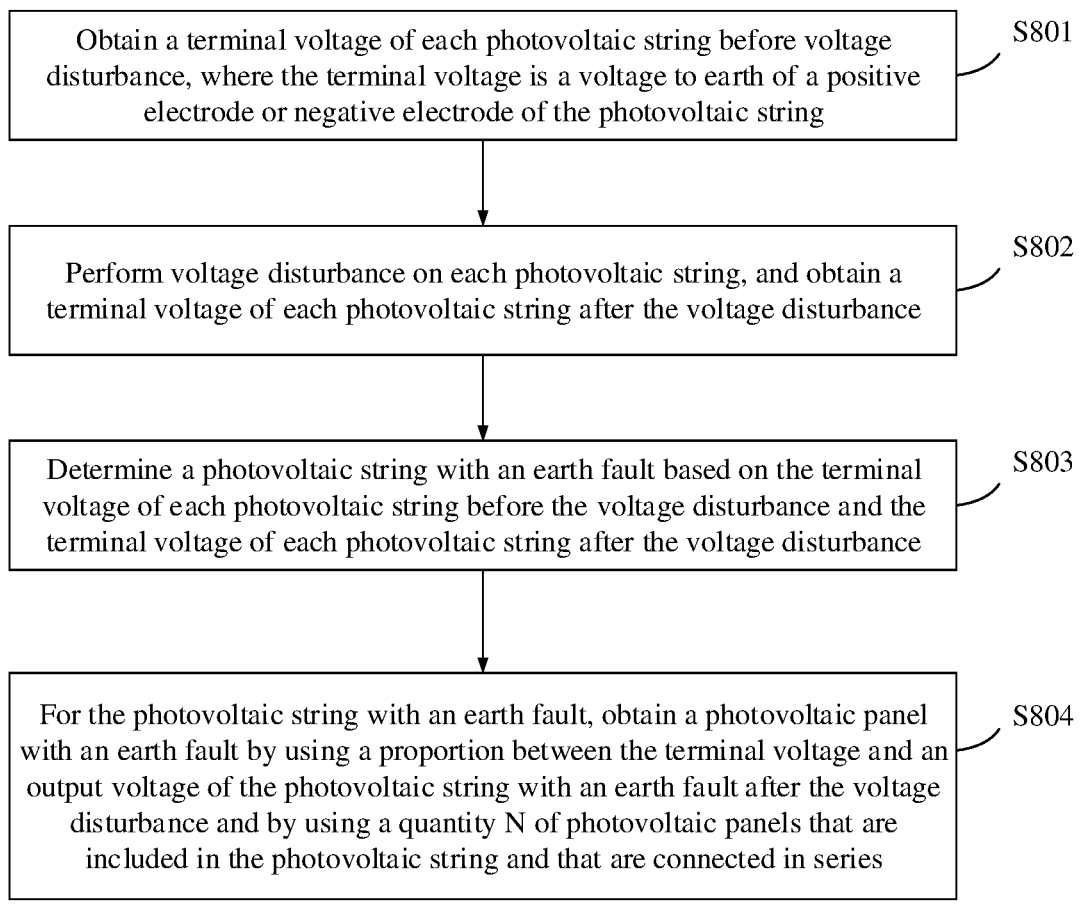
FIG. 8 is a flowchart of still another method for detecting an earth fault of a photovoltaic string according to an embodiment.

FIG. 8 is a flowchart of still another method for detecting an earth fault of a photovoltaic string according to this embodiment.

S801 to S803 are respectively the same as S501 to S503, and details are not described herein again.

S804: For the photovoltaic string with an earth fault, obtain a photovoltaic panel with an earth fault by using a proportion between the terminal voltage and an output voltage of the photovoltaic string with an earth fault after the voltage disturbance and by using a quantity N of photovoltaic panels that are included in the photovoltaic string and that are connected in series. The step may include:

when the terminal voltage is the voltage to earth of the positive electrode, obtaining the photovoltaic panel with an earth fault according to the following formula:

$$x=N^*(Upv+/Upv); \text{ or}$$

when the terminal voltage is the voltage to earth of the negative electrode, obtain the photovoltaic panel with an earth fault according to the following formula:

$$x=N^*(1-|Upv-|/Upv), \text{ where}$$

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

The foregoing formulas are based on a principle that the N photovoltaic panels are connected in series. When the $x^{th}$ photovoltaic panel is short-circuited to earth, Uv+/Uv of the photovoltaic string is x/N. Both Uv+ and Uv can be obtained by using a voltage detection circuit, and N is a known number. Therefore, x can be obtained, and x is a serial number of a photovoltaic panel on which an earth fault occurs. Similarly, the photovoltaic panel with an earth fault may alternatively be obtained by using the voltage to earth of the negative electrode of and the output voltage of the photovoltaic string after the disturbance. When the $x^{th}$ photovoltaic panel is short-circuited to earth, (1−|Uv−|/Uv) of the photovoltaic string is x/N. Both Uv− and Uv may be obtained by using the voltage detection circuit and N may be a known number. Therefore, x can be obtained.

The following provides description with reference to an example. For example, before voltage disturbance, a photovoltaic string is not subject to any control, and works at a working point corresponding to an open-circuit voltage. During voltage disturbance, an output voltage of the photovoltaic string is controlled to decrease from the open-circuit voltage.

Figure 9:
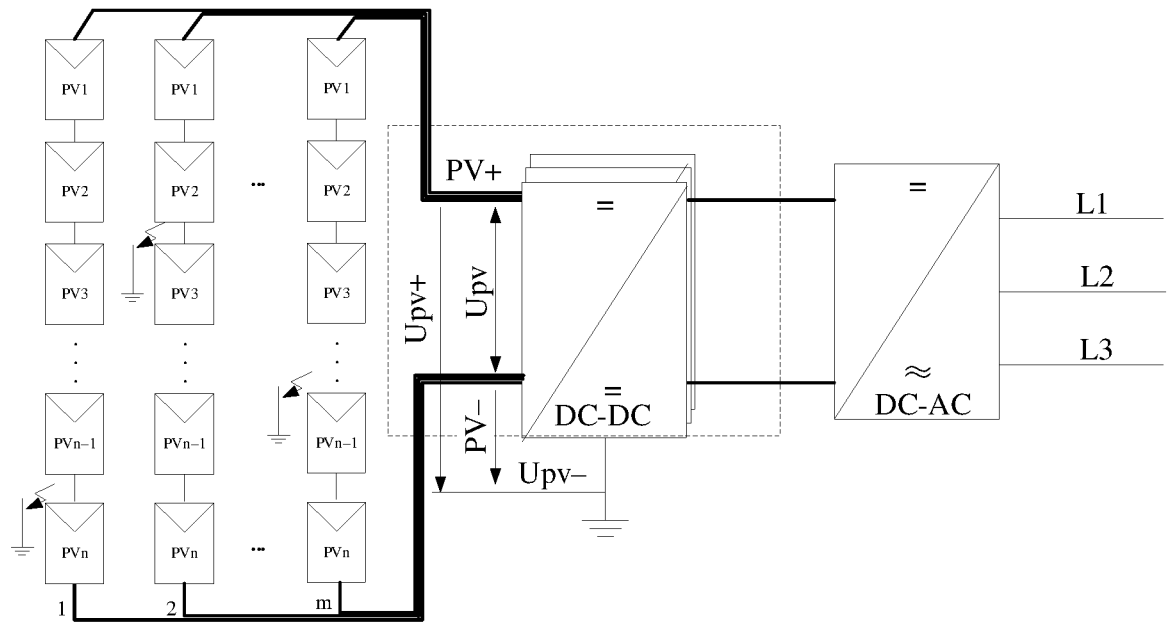
FIG. 9 is a schematic diagram of a universal photovoltaic system according to an embodiment.

In FIG. 6, only an example in which three photovoltaic strings correspond to three DC/DC conversion circuits and each string includes five photovoltaic panels is used for description. A quantity of photovoltaic strings and a quantity of photovoltaic panels not limited in the this embodiment. FIG. 9 is a schematic diagram of a universal photovoltaic system according to this embodiment.

The photovoltaic system includes m photovoltaic strings in total, where m is an integer greater than or equal to 2, and each photovoltaic string corresponds to one DC/DC or DC/AC conversion circuit. Each photovoltaic string includes n photovoltaic panels that are connected in series, where n is an integer greater than or equal to 2. In addition, a quantity of photovoltaic strings in which an earth fault occurs is not limited. A fault location can be accurately located by using the method provided in this embodiment, provided that only one earth fault occurs in each photovoltaic string.

The method provided in this embodiment is applicable to detection of an earth fault when an inverter corresponds to a plurality of photovoltaic strings. The plurality of photovoltaic strings may neither share a positive electrode nor share a negative electrode, and may be separately connected to a corresponding DC/DC or DC/AC conversion circuit. Whether a photovoltaic string has an earth fault can be accurately determined based on a change of terminal voltages before and after voltage disturbance. In addition, when a photovoltaic string has only one earth fault, a photovoltaic panel with an earth fault may be obtained by using a proportional relationship between a terminal voltage and an output voltage. The method is simple and easy to implement, and does not require any additional hardware device. A photovoltaic panel with an earth fault can be automatically determined without the need for manually performing detection on N photovoltaic panels of a photovoltaic string one by one, thereby improving efficiency.

Method Embodiment 3

This embodiment describes a plurality of photovoltaic strings. Each photovoltaic string corresponds to a respectively DC/DC or DC/AC conversion circuit. In other words, one photovoltaic string corresponds to one DC/DC conversion circuit. However, positive input terminals or negative input terminals of the DC/DC conversion circuits are short-circuited together. For example, the positive input terminals of all the conversion circuits are short-circuited together, or the negative input terminals of all the conversion circuits are short-circuited together.

Figure 10:
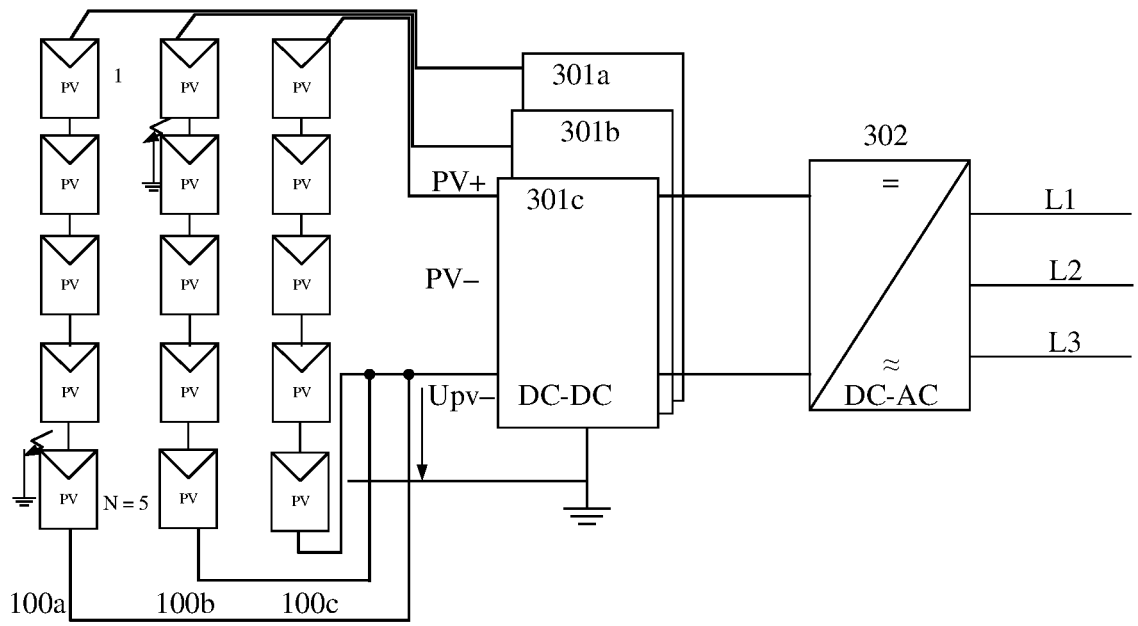
FIG. 10 is a schematic diagram of another photovoltaic power generation system corresponding to a plurality of photovoltaic strings according to an embodiment.

FIG. 10 is a schematic diagram of another photovoltaic power generation system corresponding to a plurality of photovoltaic strings according to this embodiment.

In this embodiment, negative input terminals of all DC/DC conversion circuits are short-circuited together. In other words, PVs− of photovoltaic strings are short-circuited together, and PV+ of each photovoltaic string is independently connected to a positive input terminal of a corresponding DC/DC conversion circuit.

In this embodiment, three photovoltaic strings are used as an example for description, and are respectively a first photovoltaic string 100a, a second photovoltaic string 100b, and a third photovoltaic string 100c. Both the first photovoltaic string 100a and the second photovoltaic string 100b have an earth fault. In addition, each of the three photovoltaic strings includes five photovoltaic panels that are connected in series, which are respectively the first to the fifth photovoltaic panels in sequence from PV+ to PV−.

The first photovoltaic string 100a is connected to an input terminal of a first DC/DC conversion circuit 301a.

The second photovoltaic string 100b is connected to an input terminal of a second DC/DC conversion circuit 301b.

The third photovoltaic string 100c is connected to an input terminal of a third DC/DC conversion circuit 301c.

Negative input terminals of the first DC/DC conversion circuit 301a, the second DC/DC conversion circuit 301b, and the third DC/DC conversion circuit 301c are all connected together, namely PVs− are all short-circuited together. Therefore, the three photovoltaic strings have an equal Upv−.

The negative input terminals of the first DC/DC conversion circuit 301a, the second DC/DC conversion circuit 301b, and the third DC/DC conversion circuit 301c are all connected together. Output terminals of the first DC/DC conversion circuit 301a, the second DC/DC conversion circuit 301b, and the third DC/DC conversion circuit 301c may be connected in parallel.

The first DC/DC conversion circuit 301a, the second DC/DC conversion circuit 301b, the third DC/DC conversion circuit 301c, and an inverter circuit 302 may be integrated into an inverter.

PVs− of all photovoltaic strings are short-circuited together. Therefore, voltage disturbance cannot be performed on two or more photovoltaic strings at the same time, and voltage disturbance needs to be performed on each photovoltaic string in sequence.

Figure 11:
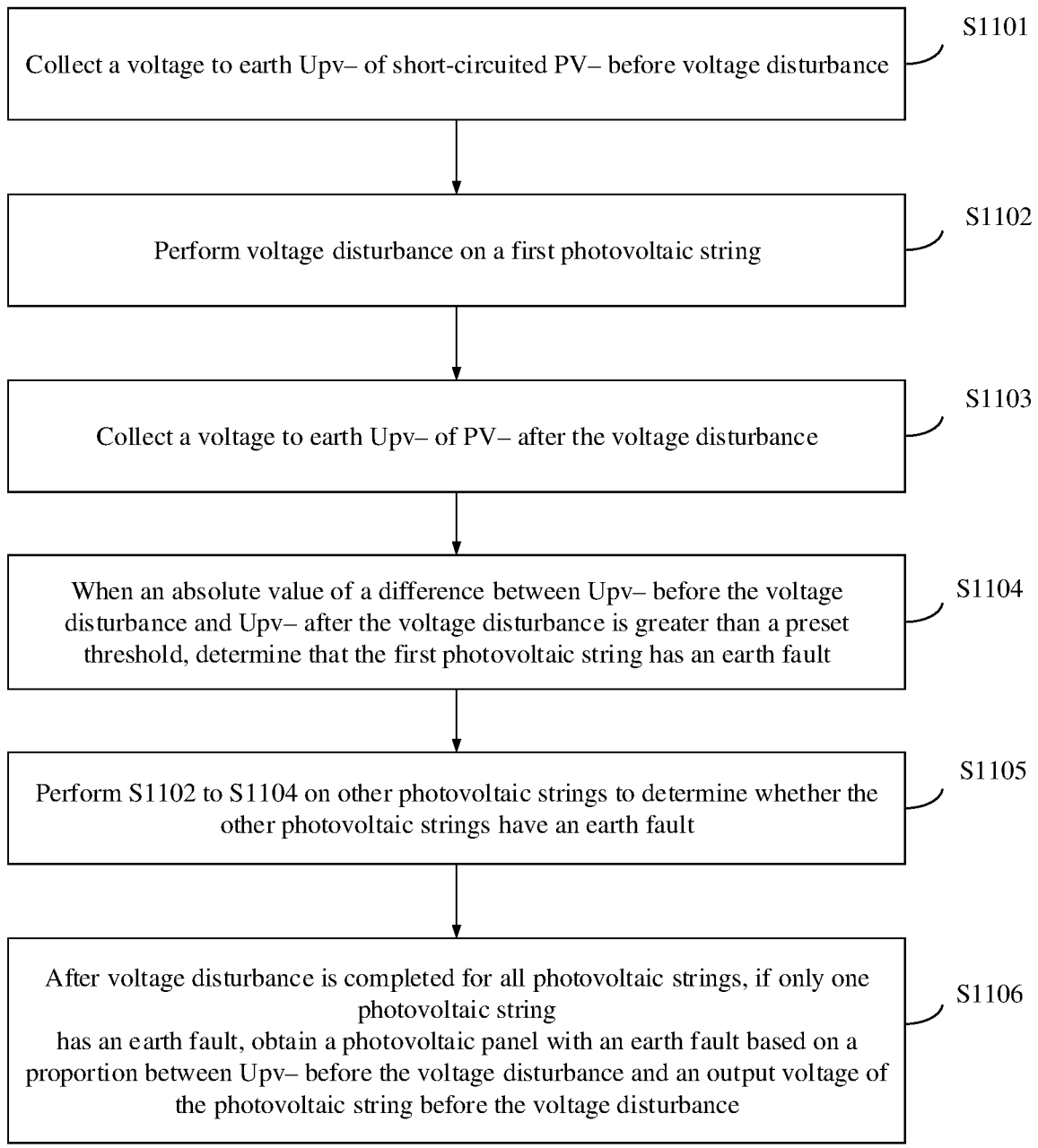
FIG. 11 is a flowchart of still yet another method for detecting an earth fault of a photovoltaic string according to an embodiment.

FIG. 11 is a flowchart of still another method for detecting an earth fault of a photovoltaic string according to this embodiment.

S1101: Collect a voltage to earth Upv− of short-circuited PV− before voltage disturbance.

S1102: Perform voltage disturbance on a first photovoltaic string.

For a voltage disturbance manner, refer to the description in the foregoing embodiments. No control is performed on the remaining photovoltaic strings. For example, voltage disturbance is first performed on the first photovoltaic string 100a.

S1103: Collect a voltage to earth Upv− of PV− after the voltage disturbance.

The photovoltaic strings may be disturbed one by one. It is not limited in this embodiment that voltage disturbance needs to start from the first photovoltaic string. In other words, a sequence of voltage disturbance on the photovoltaic strings is not limited.

PVs− of all the photovoltaic strings are short-circuited together. Therefore, one circuit is sufficient for sampling voltages to earth of the PVs.

PVs− of all photovoltaic strings are short-circuited together. Therefore, Upv− is an overall voltage to earth of a negative electrode of a photovoltaic array.

S1104: When an absolute value of a difference between Upv− before the voltage disturbance and Upv− after the voltage disturbance is greater than a preset threshold, determine that the first photovoltaic string has an earth fault.

S1105: Perform S1102 to S1104 on another photovoltaic string to determine whether an earth fault occurs.

PVs− are short-circuited together. Therefore, voltage disturbance needs to be performed on each photovoltaic string one by one to determine whether an earth fault occurs.

For example, when voltage disturbance is performed on a second photovoltaic string, no control is performed on other photovoltaic strings, and only an output voltage of the second photovoltaic string is controlled to change.

S1106: When voltage disturbance is completed on all photovoltaic strings, if only one photovoltaic string has an earth fault, obtain a photovoltaic panel with an earth fault by using a proportion between Upv− before the voltage disturbance and an output voltage of the photovoltaic string before the voltage disturbance.

For example, when voltage disturbance is completed on all photovoltaic strings, and it is determined that only the first photovoltaic string has an earth fault, a photovoltaic panel with an earth fault in the first photovoltaic string is obtained according to the following formula: $x=(1-|Upv-1|/U1)*N$. U1 is an output voltage of the first photovoltaic string.

According to the method provided in this embodiment, positive electrodes or negative electrodes of all photovoltaic strings are connected together. Therefore, a location of a photovoltaic panel with an earth fault can be accurately obtained only when only one string has an earth fault. When a plurality of strings may have an earth fault, only the photovoltaic strings with an earth fault may be accurately determined, and a location of a photovoltaic panel with an earth fault may not be accurately obtained.

In this embodiment, only an example in which PVs− of the photovoltaic strings are short-circuited together is used for description. Similarly, PVs− of the photovoltaic strings may be independent of each other, and PVs+ of the photovoltaic strings are short-circuited together.

According to the method provided in this embodiment, when a plurality of photovoltaic strings may be short-circuited together at one end, when positive electrodes of a plurality of photovoltaic strings in a photovoltaic array may be short-circuited together, or negative electrodes of the plurality of photovoltaic strings may be short-circuited together, whether each photovoltaic string has an earth fault may be accurately determined by performing voltage disturbance on the photovoltaic strings in sequence. When an earth fault occurs at only one location, a location of a faulty photovoltaic panel can be accurately located by using a proportional relationship between a terminal voltage and an output voltage.

Photovoltaic Device Embodiment 1

Based on the method for detecting an earth fault of a photovoltaic string provided in the foregoing embodiments, this embodiment may further provide a photovoltaic device. The following describes a working principle of the photovoltaic device in detail with reference to accompanying drawings.

Figure 12:
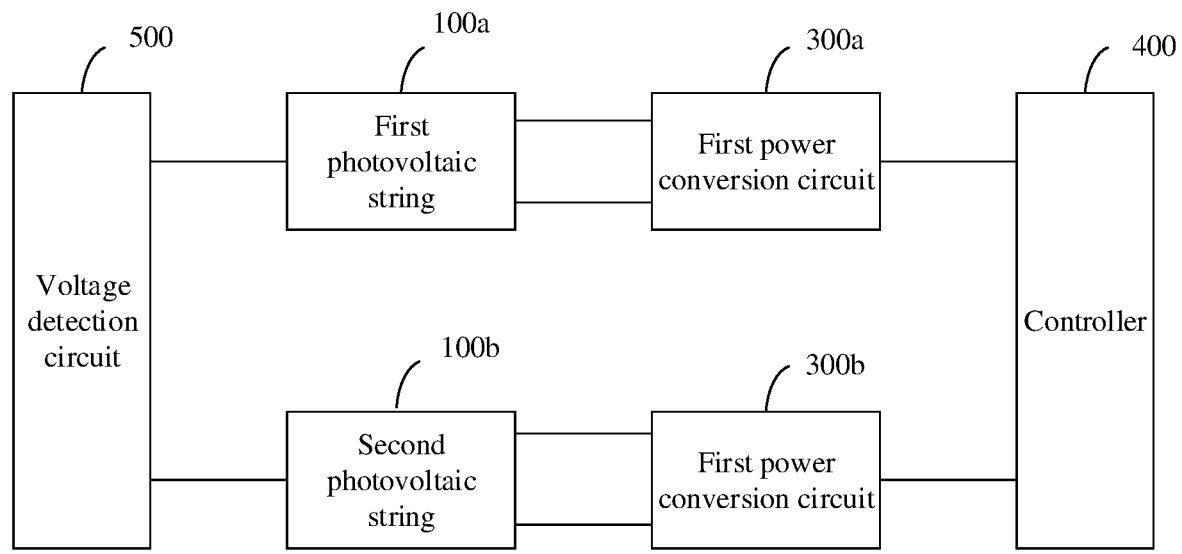
FIG. 12 is a schematic diagram of a photovoltaic device according to an embodiment.

FIG. 12 is a schematic diagram of a photovoltaic device for detecting an earth fault according to this embodiment.

The photovoltaic device for detecting an earth fault provided in this embodiment may include a power conversion circuit, a controller 400, and a voltage detection circuit 500.

The power conversion circuit is in a one-to-one correspondence with a photovoltaic string, and each photovoltaic string is connected to a corresponding power conversion circuit. In other words, one power conversion circuit corresponds to one photovoltaic string. The power conversion circuit may be a DC/DC conversion circuit, or may be a DC/AC conversion circuit. The photovoltaic string is in a one-to-one correspondence with the power conversion circuit. Therefore, the photovoltaic string can be independently controlled.

In FIG. 12, two photovoltaic strings, namely, a first photovoltaic string 100a and a second photovoltaic string 100b, are used as an example for description.

The first photovoltaic string 100a is connected to a corresponding first power conversion circuit 300a, and the second photovoltaic string 100b is connected to a corresponding second power conversion circuit 300b.

The voltage detection circuit 500 is configured to obtain a terminal voltage of each photovoltaic string before voltage disturbance, where the terminal voltage is a voltage to earth of a positive electrode or negative electrode of the photovoltaic string.

It should be noted that one voltage detection circuit may be disposed for each photovoltaic string, or a plurality of photovoltaic strings may share one voltage detection circuit. This is not limited in this embodiment.

The controller 400 is configured to perform voltage disturbance on each photovoltaic string.

When both positive input terminals and negative input terminals of the first power conversion circuit 300a and the second power conversion circuit 300b are independent of each other and are not connected together, the controller 400 may perform voltage disturbance on the first photovoltaic string 100a and the second photovoltaic string 100b at the same time. When the positive input terminals or the negative input terminals of the first power conversion circuit 300a and the second power conversion circuit 300b are connected together, the controller 400 needs to perform voltage disturbance on the first photovoltaic string 100a and the second photovoltaic string 100b in sequence.

A plurality of voltage disturbance manners may be available. For example, an output voltage of a photovoltaic string is controlled to change from a large value to a small value, or an output voltage of a photovoltaic string is controlled to change from a small value to a large value, or is controlled to change from an open-circuit voltage to a short-circuit voltage. Control may be implemented through scanning along a current-voltage IV curve of the photovoltaic string, so that the photovoltaic string works at a point of the IV curve.

For example, controlling an output voltage of a voltage-disturbed photovoltaic string to change along a voltage decreasing direction may include:

controlling the output voltage of the voltage-disturbed photovoltaic string to change from an open-circuit voltage before the voltage disturbance to a first preset voltage after the voltage disturbance, where the first preset voltage is less than the open-circuit voltage.

The first preset voltage may be a voltage that corresponds to any working point and that is less than the open-circuit voltage.

The voltage detection circuit 500 is further configured to obtain a terminal voltage of each photovoltaic string after the voltage disturbance.

The controller 400 is further configured to determine a photovoltaic string with an earth fault based on the terminal voltage of each photovoltaic string before the voltage disturbance and the terminal voltage of each photovoltaic string after the voltage disturbance; and for the photovoltaic string with an earth fault, obtain a photovoltaic panel with an earth fault by using the terminal voltage and an output voltage of the photovoltaic string before the voltage disturbance, or obtain a photovoltaic panel with an earth fault by using the terminal voltage and an output voltage of the photovoltaic string after the voltage disturbance.

It should be noted that, when a voltage parameter before the voltage disturbance is used to locate a location of the earth fault, the voltage detection circuit 500 may further obtain the output voltage of the photovoltaic string before the voltage disturbance. When a voltage parameter after the voltage disturbance is used, the voltage detection circuit 500 may further obtain the output voltage of the photovoltaic string after the voltage disturbance.

In this embodiment, a location of the controller 400 may not be limited. The controller 400 may be a controller corresponding to a power conversion circuit. In other words, each power conversion circuit corresponds to one controller. Alternatively, the power conversion circuits may share one controller, and the power conversion circuits may communicate with the controller.

When an earth fault occurs on a photovoltaic panel in the photovoltaic string, a voltage to earth Upv+ of the positive electrode PV+ of the photovoltaic string may be different from a voltage to earth before the disturbance; and similarly, a voltage to earth Upv− of the negative electrode PV− of the photovoltaic string before the disturbance may be different from that after the disturbance.

For whether an earth fault occurs in a photovoltaic string, whether a short-circuit fault occurs may be determined based on a difference between Upv+ before voltage disturbance and Upv+ after the voltage disturbance, or whether a short-circuit fault occurs may be determined based on a difference between Upv− before voltage disturbance and Upv− after the voltage disturbance.

For example, when an absolute value of a difference between a terminal voltage of a photovoltaic string before voltage disturbance and a terminal voltage of the photovoltaic string after the voltage disturbance exceeds a preset threshold, it is determined that the photovoltaic string is a photovoltaic string with an earth fault.

For one photovoltaic string, when an earth fault occurs at only one location, a proportional relationship exists between a terminal voltage of the photovoltaic string and an output voltage of the photovoltaic string. Therefore, a location of a photovoltaic panel with an earth fault in the photovoltaic string may be obtained by using the proportional relationship between the terminal voltage and the output voltage of the photovoltaic string.

A proportion between the terminal voltage and the output voltage of the photovoltaic string may use a proportion between a terminal voltage before the voltage disturbance and the output voltage of the photovoltaic string, or may use a proportion between a terminal voltage after the disturbance and the output voltage of the photovoltaic string.

Still referring to FIG. 4, five photovoltaic panels are connected in series between PV+ and PV−. Therefore, assuming that an earth fault occurs on the second photovoltaic panel, when it is detected, regardless of whether before the voltage disturbance or after the voltage disturbance, that a proportion between an absolute value of Upv+ and Upv is ⅖ or that a proportion between an absolute value of Upv− and Upv is ⅗, it indicates that an earth fault occurs on the second photovoltaic panel. It should be noted that the second photovoltaic panel herein is the second photovoltaic panel counted from the PV+ end. In addition, in some photovoltaic arrays, when a quantity of photovoltaic panels included in each photovoltaic string is unknown, N and x herein represent percentages. N may represent 100% and x may represent a distance, in percentage, to PV+ from a location at which a fault occurs in the photovoltaic string. For example, if x=20%, it indicates that an earth fault occurs at a location of approximately 20%.

The photovoltaic device provided in this embodiment may be in a form shown in FIG. 4, or may be in a form shown in FIG. 6, or may be in a form shown in FIG. 10. Negative input terminals of all DC/DC conversion circuits in FIG. 10 are connected together. In addition, alternatively, positive input terminals of all DC/DC conversion circuits may be connected together.

Figure 13:
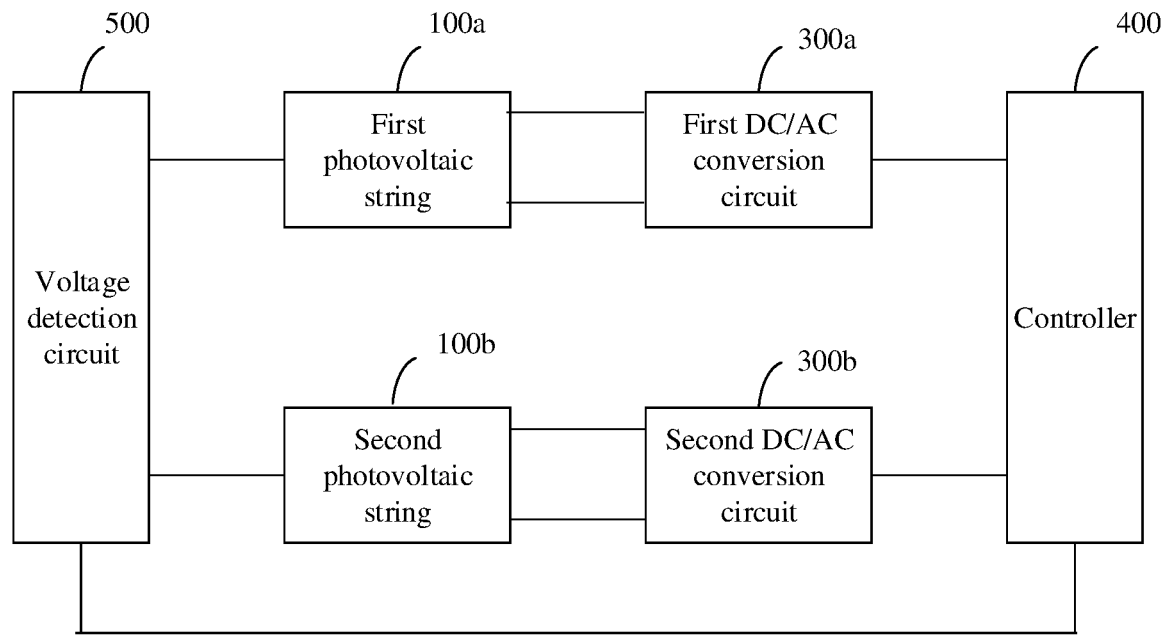
FIG. 13 is a schematic diagram of another photovoltaic device according to an embodiment.

In addition, when the power conversion circuit may be a DC/AC conversion circuit, refer to FIG. 13. FIG. 13 is a schematic diagram of another photovoltaic device for detecting an earth fault according to this embodiment.

The photovoltaic device shown in FIG. 13 does not include a DC/DC conversion circuit, but includes only a DC/AC conversion circuit. In other words, when the photovoltaic device is an inverter, the inverter is a single-stage inverter. The inverters shown in FIG. 6 and FIG. 10 are two-stage inverters, and a two-stage inverter includes both a DC/DC conversion circuit and a DC/AC conversion circuit.

A first photovoltaic string 100a is connected to a corresponding first DC/AC conversion circuit 300a, and a second photovoltaic string 100b is connected to a corresponding second DC/AC conversion circuit 300b.

A voltage detection circuit 500 is configured to detect terminal voltages and output voltages of the first photovoltaic string 100a and the second photovoltaic string 100b before voltage disturbance, and is also configured to detect terminal voltages and output voltages of the first photovoltaic string 100a and the second photovoltaic string 100b after the voltage disturbance. The voltage detection circuit 500 sends both the detected terminal voltages and output voltages to a controller 400.

The controller 400 controls an output voltage of the first photovoltaic string 100a by controlling an input voltage of the first DC/AC conversion circuit 300a and controls an output voltage of the second photovoltaic string 100b by controlling an input voltage of the second DC/AC conversion circuit 300b, so as to implement voltage disturbance for the first photovoltaic string 100a and the second photovoltaic string 100b.

For example, a photovoltaic panel with an earth fault is obtained by using a proportion between Upv+ before the voltage disturbance and Upv before the voltage disturbance.

It should be noted that the foregoing describes only an implementation. A location of an earth fault can be determined provided that a proportional relationship exists between a terminal voltage and an output voltage of an entire string. The foregoing proportion is not necessarily exactly ⅖. Sampling may be different from an actual working environment. Therefore, even if a slight deviation occurs, a corresponding photovoltaic panel with an earth faulty can still be determined provided that the deviation is within a preset deviation range.

It should be noted that an earth fault of a photovoltaic panel not only means that a short circuit to earth occurs on the photovoltaic panel but may also be a short circuit to earth caused by an insulation damage to a cable connected in series before or after the photovoltaic panel.

According to the photovoltaic device provided in this embodiment, an output voltage of a photovoltaic string is disturbed. In other words, the output voltage of the photovoltaic string is controlled to change. Whether an earth fault occurs in the photovoltaic string is determined by using a terminal voltage of the photovoltaic string before the voltage disturbance and a terminal voltage of the photovoltaic string after the voltage disturbance. When the terminal voltage before the voltage disturbance and the terminal voltage after the voltage disturbance vary obviously, it indicates that an earth fault occurs in the photovoltaic string. All photovoltaic panels in the photovoltaic string are connected in series. When an earth fault occurs at a location in the photovoltaic string, an electrical potential at the location of the earth fault is approximately equal to a reference ground. In this case, a voltage allocated to all photovoltaic panels from one end of the photovoltaic string to the fault location may be considered as a terminal voltage. Therefore, the location at which the earth fault occurs may be determined by using a proportion between the terminal voltage and an output voltage of the entire string. The device is simple and easy to implement and does not require any additional hardware device. A photovoltaic panel with an earth fault can be automatically determined without the need for manually performing detection on N photovoltaic panels of a photovoltaic string one by one, thereby improving efficiency.

A faulty photovoltaic panel may be obtained by using a proportion between the terminal voltage and the output voltage of the photovoltaic string before the voltage disturbance or may be obtained by using a proportion between the terminal voltage and the output voltage of the photovoltaic string after the voltage disturbance. Details are separately described below.

First manner: The terminal voltage before the voltage disturbance and the output voltage of the entire string before the voltage disturbance are used.

The controller may be configured to: when the terminal voltage is the voltage to earth of the positive electrode, obtain the photovoltaic panel with an earth fault according to the following formula:

$x=N*(Upv+/Upv)$; or when the terminal voltage is the voltage to earth of the negative electrode, obtain the photovoltaic panel with an earth fault according to the following formula:

$x=N*(1-|Upv-|/Upv)$, where

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

The foregoing formulas are based on a principle that the N photovoltaic panels are connected in series. When the $x^{th}$ photovoltaic panel is short-circuited to earth, Upv+/Upv of the photovoltaic string is x/N. Both Upv+ and Upv can be obtained by using the voltage detection circuit, and N is a known number. Therefore, x can be obtained, and x is the photovoltaic panel on which an earth fault occurs. Similarly, the photovoltaic panel with an earth fault may alternatively be obtained by using the voltage to earth of the negative electrode of and the output voltage of the photovoltaic string before the disturbance. When the $x^{th}$ photovoltaic panel is short-circuited to earth, (1−|Upv−|/Upv) of the photovoltaic string may be x/N. Both Upv− and Upv can be obtained by using the voltage detection circuit, and N is a known number. Therefore, x can be obtained.

For example, before the voltage disturbance, an open-circuit voltage U1 of the first photovoltaic string 100a in an open circuit and an open-circuit voltage U2 of the second photovoltaic string 100b in an open circuit are separately collected. Before the voltage disturbance, a voltage to earth U1− of PV− when the first photovoltaic string 100a is in an open circuit and a voltage to earth U2− of PV− when the second photovoltaic string 100b is in an open circuit are separately collected.

In this case, the photovoltaic panel x1 with an earth fault in the first photovoltaic string $100a=(1-|U1-|/U1)*N$; and the photovoltaic panel x2 with an earth fault in the second photovoltaic string $100b=(1-|U2-|/U2)*N$.

The foregoing describes how to determine a location of an earth fault by using a proportion between a terminal voltage before disturbance and an output voltage before the disturbance. The following describes how to determine a location of an earth fault by using a proportion between a terminal voltage after disturbance and an output voltage after the disturbance.

Second manner: The terminal voltage after the voltage disturbance and the output voltage of the entire string after the voltage disturbance are used.

The controller may be configured to obtain the photovoltaic panel with an earth fault by using a ratio between the terminal voltage and the output voltage of the photovoltaic string with an earth fault after the voltage disturbance and by using a quantity N of photovoltaic panels that are included in the photovoltaic string and that are connected in series.

The controller may be configured to: when the terminal voltage is the voltage to earth of the positive electrode, obtain the photovoltaic panel with an earth fault according to the following formula:

$x=N*(Upv+/Upv)$; or when the terminal voltage is the voltage to earth of the negative electrode, obtain the photovoltaic panel with an earth fault according to the following formula:

$x=N*(1-|Upv-|/Upv)$, where

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

For example, before voltage disturbance, a photovoltaic string is not subject to any control, and works at a working point corresponding to an open-circuit voltage. During voltage disturbance, an output voltage of the photovoltaic string is controlled to decrease from the open-circuit voltage.

It should be noted that, when a connection relationship between a photovoltaic device and a photovoltaic string is shown in FIG. 4 and FIG. 6, regardless of whether there is one or more photovoltaic strings, a fault location can be accurately located provided that one earth fault occurs in the string. When a connection relationship between a photovoltaic device and a photovoltaic string is shown in FIG. 10, PVs− of all photovoltaic strings are short-circuited together. Therefore, voltage disturbance cannot be performed on two or more photovoltaic strings at the same time, and voltage disturbance needs to be performed on each photovoltaic string in sequence. In addition, in the photovoltaic device corresponding to FIG. 10, positive electrodes or negative electrodes of the photovoltaic strings are connected together. Therefore, a location of a photovoltaic panel with an earth fault can be accurately obtained only when only one string has an earth fault. When a plurality of strings may have an earth fault, only the photovoltaic strings with an earth fault may be accurately determined, and a location of a photovoltaic panel with an earth fault may not be accurately obtained.

In the photovoltaic device shown in FIG. 10, when a plurality of photovoltaic strings may be short-circuited together at one end, when positive electrodes of a plurality of photovoltaic strings in a photovoltaic array may be short-circuited together, or negative electrodes of the plurality of photovoltaic strings may be short-circuited together, whether each photovoltaic string has an earth fault may be accurately determined by performing voltage disturbance on the photovoltaic strings in sequence. When an earth fault occurs at only one location, a location of a faulty photovoltaic panel can be accurately located by using a proportional relationship between a terminal voltage and an output voltage.

PVs− of all the photovoltaic strings are short-circuited together. Therefore, one circuit is sufficient for sampling voltages to earth of the PVs.

By using the photovoltaic device provided in the foregoing embodiment, when only one photovoltaic string exists and only one earth fault occurs in the photovoltaic string, a location of the earth fault in the photovoltaic string can be accurately located. When there may be a plurality of corresponding photovoltaic strings, and neither positive electrodes nor negative electrodes of the photovoltaic strings may be connected together, all photovoltaic strings having an earth fault may be identified. In addition, when one photovoltaic string has only one earth fault, a fault location can be accurately located. When there may be a plurality of corresponding photovoltaic strings, and positive electrodes or negative electrodes of all the photovoltaic strings may be connected together, all photovoltaic strings having an earth fault may be identified. When there is only one earth fault, a location of a faulty photovoltaic panel can be accurately located by using a proportional relationship between a terminal voltage and an output voltage.

System Embodiment

Based on the photovoltaic device for detecting an earth fault of a photovoltaic string provided in the foregoing embodiment, this embodiment may further provide a photovoltaic power generation system, which is described in detail with reference to accompanying drawings.

Figure 14:
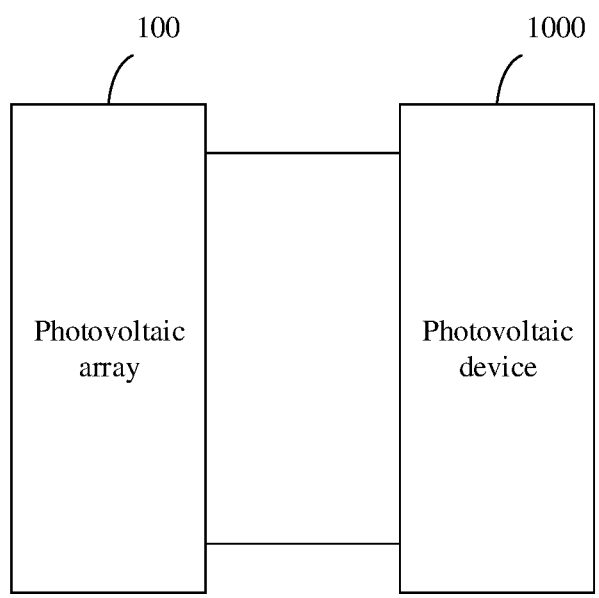
FIG. 14 is a schematic diagram of a photovoltaic power generation system according to an embodiment.

FIG. 14 is a schematic diagram of a photovoltaic power generation system according to this embodiment.

This embodiment may provide a photovoltaic power generation system, including a photovoltaic array, a photovoltaic device, and a controller.

The photovoltaic array includes m photovoltaic strings, where m is an integer greater than or equal to 1.

The photovoltaic device includes m power conversion circuits, the power conversion circuits are in a one-to-one correspondence with the photovoltaic strings, and each photovoltaic string is connected to a corresponding power conversion circuit.

The controller is configured to: obtain a terminal voltage of each photovoltaic string before voltage disturbance, where the terminal voltage is a voltage to earth of a positive electrode or negative electrode of the photovoltaic string; perform voltage disturbance on each photovoltaic string and obtain a terminal voltage of each photovoltaic string after the voltage disturbance; determine a photovoltaic string with an earth fault based on the terminal voltage of each photovoltaic string before the voltage disturbance and the terminal voltage of each photovoltaic string after the voltage disturbance; and for the photovoltaic string with an earth fault, obtain a photovoltaic panel with an earth fault by using the terminal voltage and an output voltage of the photovoltaic string before the voltage disturbance, or obtain a photovoltaic panel with an earth fault by using the terminal voltage and an output voltage of the photovoltaic string after the voltage disturbance.

The controller may be configured to: when an absolute value of a difference between the terminal voltage of the photovoltaic string before the voltage disturbance and the terminal voltage of the photovoltaic string after the voltage disturbance exceeds a preset threshold, determine that the photovoltaic string is a photovoltaic string with an earth fault.

The controller may be configured to control an output voltage of a voltage-disturbed photovoltaic string to change along a voltage increasing direction or change along a voltage decreasing direction.

The controller may be configured to control the output voltage of the voltage-disturbed photovoltaic string to change from an open-circuit voltage before the voltage disturbance to a first preset voltage after the voltage disturbance, where the first preset voltage is less than the open-circuit voltage.

The controller may be configured to control the output voltage of the voltage-disturbed photovoltaic string to change from an open-circuit voltage before the voltage disturbance to a short-circuit voltage after the voltage disturbance.

The controller may be configured to obtain the photovoltaic panel with an earth fault by using a proportion between the terminal voltage and the output voltage of the photovoltaic string with an earth fault before the voltage disturbance and by using a quantity N of photovoltaic panels that are included in the photovoltaic string and that are connected in series.

The controller may be configured to: when the terminal voltage is the voltage to earth of the positive electrode, obtain the photovoltaic panel with an earth fault according to the following formula:

$x = N^*(Upv+/Upv)$; or when the terminal voltage is the voltage to earth of the negative electrode, obtain the photovoltaic panel with an earth fault according to the following formula:

$x = N^*(1-|Upv-|/Upv)$, where

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

The controller may be configured to obtain the photovoltaic panel with an earth fault by using a ratio between the terminal voltage and the output voltage of the photovoltaic string with an earth fault after the voltage disturbance and by using a quantity N of photovoltaic panels that are included in the photovoltaic string and that are connected in series.

The controller may be configured to: when the terminal voltage is the voltage to earth of the positive electrode, obtain the photovoltaic panel with an earth fault according to the following formula:

$x = N^*(Upv+/Upv)$; or when the terminal voltage is the voltage to earth of the negative electrode, obtain the photovoltaic panel with an earth fault according to the following formula:

$x = N*(1-|Upv-|/Upv)$, where

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are included in the photovoltaic string with an earth fault and that are connected in series, and x represents the $x^{th}$ photovoltaic panel starting from the positive electrode of the photovoltaic string with an earth fault.

A photovoltaic power generation system provided in this embodiment includes a photovoltaic array 100 and a photovoltaic device 1000 described in the foregoing embodiment.

The photovoltaic array 100 includes M photovoltaic strings, where M is an integer greater than or equal to 1.

The photovoltaic device 1000 includes M power conversion circuits.

There is a one-to-one relationship between the M photovoltaic strings in the photovoltaic array 100 and the M power conversion circuits in the photovoltaic device 1000. In other words, an input terminal of each power conversion circuit is connected to a photovoltaic string corresponding to the power conversion circuit.

The photovoltaic device may be an inverter or may be a combiner box. This is not limited in this embodiment.

When the photovoltaic device is an inverter, the inverter may be a two-stage inverter. As shown in FIG. 6, the inverter may include a DC/DC conversion circuit and a DC/AC conversion circuit. The inverter may alternatively be a single-stage inverter, which includes only a DC/AC conversion circuit, as shown in FIG. 13.

For an implementation of detecting an earth fault of a photovoltaic string by the controller in the photovoltaic power generation system, refer to descriptions in the method embodiments and the photovoltaic device embodiment. Details are not described herein again.

The photovoltaic power generation system provided in this embodiment may include the photovoltaic device described in the foregoing embodiment. When only one photovoltaic string exists and only one earth fault occurs in the photovoltaic string, a location of the earth fault in the photovoltaic string can be accurately located. When there may be a plurality of corresponding photovoltaic strings, and neither positive electrodes nor negative electrodes of the photovoltaic strings may be connected together, all photovoltaic strings having an earth fault may be identified. In addition, when one photovoltaic string has only one earth fault, a fault location can be accurately located. When there may be a plurality of corresponding photovoltaic strings, and positive electrodes or negative electrodes of all the photovoltaic strings may be connected together, all photovoltaic strings having an earth fault may be identified. When there is only one earth fault, a location of a faulty photovoltaic panel can be accurately located by using a proportional relationship between a terminal voltage and an output voltage. The photovoltaic power generation system may monitor an earth fault of the photovoltaic array before the inverter is grid-connected. When a direct current insulation resistance is low, in other words, when an earth fault occurs, the fault is rectified in time based on a located fault location, so that the photovoltaic power generation system can run normally as soon as possible, and perform grid-connected power generation, thereby improving work efficiency.

It should be understood that "at least one (item)" means one or more and "a plurality of" means two or more. The term "and/or" is used for describing an association relationship between associated objects, and represents that three relationships may exist. For example, "A and/or B" may represent the following three cases: only A exists, only B exists, and both A and B exist, where A and B may be singular or plural. The character "/" may indicate an "or" relationship between the associated objects. "At least one of the following items (pieces)" or a similar expression thereof refers to any combination of these items, including any combination of singular items (pieces) or plural items (pieces). For example, at least one of a, b, or c may indicate a, b, c, a and b, a and c, b and c, or a and b and c, where a, b, and c may be singular or plural.

The foregoing embodiments are merely intended for describing rather than limiting. Although described in detail with reference to the foregoing embodiments, persons of ordinary skill in the art should understand that they may still make modifications to without departing from the spirit and scope of the embodiments.

What is claimed is:

1. A photovoltaic power generation system, comprising:
   a photovoltaic array, wherein the photovoltaic array comprises m photovoltaic strings, wherein m is an integer greater than or equal to 1;
   a photovoltaic device comprising m power conversion circuits, wherein the power conversion circuits are in a one-to-one correspondence with the photovoltaic strings and each photovoltaic string is connected to the corresponding power conversion circuit; and
   a controller
   configured to:
   obtain a terminal voltage of each photovoltaic string before voltage disturbance, wherein the terminal voltage is a voltage to earth of a positive electrode or negative electrode of the photovoltaic string;
   perform voltage disturbance on each photovoltaic string;
   obtain a terminal voltage of each photovoltaic string after the voltage disturbance;
   determine a photovoltaic string with an earth fault based on the terminal voltage of each photovoltaic string before the voltage disturbance and the terminal voltage of each photovoltaic string after the voltage disturbance; and
   for the photovoltaic string with the earth fault, obtain a photovoltaic panel with an earth fault by using the terminal voltage and an output voltage of the photovoltaic string before the voltage disturbance, or
   obtain a photovoltaic panel with an the fault by using the terminal voltage and an output voltage of the photovoltaic string after the voltage disturbance.

2. The photovoltaic power generation system according to claim 1, wherein the controller is further configured to:
   when an absolute value of a difference between the terminal voltage of the photovoltaic string before the voltage disturbance and the terminal voltage of the photovoltaic string after the voltage disturbance exceeds a preset threshold, determine that the photovoltaic string is the photovoltaic string with the earth fault.

3. The photovoltaic power generation system according to claim 2, wherein the controller is further configured to:
   obtain the photovoltaic panel with the earth fault by using a proportion between the terminal voltage and the output voltage of the photovoltaic string with the earth fault before the voltage disturbance and by using a quantity N of photovoltaic panels that are comprised in the photovoltaic string and that are connected in series.

4. The photovoltaic power generation system according to claim 3, wherein the controller is further configured to:
when the terminal voltage is the voltage to earth of the positive electrode, obtain the photovoltaic panel with the earth fault according to the following formula:

$x=N*(Upv+/Upv)$; or when the terminal voltage is the voltage to earth of the negative electrode, obtain the photovoltaic panel with the earth fault according to the following formula:

$x=N*(1-|Upv-|/Upv)$, wherein

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are comprised in the photovoltaic string with the earth fault and that are connected in series, and x represents the $x^{th}$ photovoltaic panel starting from the positive electrode of the photovoltaic string with the earth fault.

5. The photovoltaic power generation system according to claim 2, wherein the controller is further configured to;
obtain the photovoltaic panel with the earth fault by using a proportion between the terminal voltage and the output voltage of the photovoltaic string with the earth fault after the voltage disturbance and by using a quantity N of photovoltaic panels that are comprised in the photovoltaic string and that are connected in series.

6. The photovoltaic power generation system according to claim 5, wherein the controller is further configured to:
when the terminal voltage is the voltage to earth of the positive electrode, obtain the photovoltaic panel with the earth fault according to the following formula:

$X=N*(Uv+/Uv)$; or when the terminal voltage is a voltage to earth of the negative electrode, obtain the photovoltaic panel with the earth fault according to the following formula:

$X=N*(1-|Uv-|/Uv)$, wherein

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are comprised in the photovoltaic string with the earth fault and that are connected in series, and x represents the $x^{th}$ photovoltaic panel starting from the positive electrode of the photovoltaic string with the earth fault.

7. The photovoltaic power generation system according to claim 1, wherein the controller is further configured to:
control an output voltage of a voltage-disturbed photovoltaic string to change along a voltage increasing direction or change along a voltage decreasing direction.

8. The photovoltaic power generation system according to claim 7, wherein the controller is further configured to:
control the output voltage of the voltage-disturbed photovoltaic string to change from an open-circuit voltage before the voltage disturbance to a first preset voltage after the voltage disturbance, wherein the first preset voltage is less than the open-circuit voltage.

9. The photovoltaic power generation system according to claim 8, wherein the controller is further configured to:
control the output voltage of the voltage-disturbed photovoltaic string to change from an open-circuit voltage before the voltage disturbance to a short-circuit voltage after the voltage disturbance.

10. A method for detecting an earth fault of a photovoltaic string, comprising:
obtaining a terminal voltage of each photovoltaic string of a plurality of photovoltaic strings before voltage disturbance, wherein the terminal voltage is a voltage to earth of a positive electrode or negative electrode of the photovoltaic string;
performing voltage disturbance on each photovoltaic string, and obtaining a terminal voltage of each photovoltaic string after the voltage disturbance;
determining a photovoltaic string with the earth fault based on the terminal voltage of each photovoltaic string before the voltage disturbance and the terminal voltage of each photovoltaic string after the voltage disturbance; and
for the photovoltaic string with the earth fault, obtaining a photovoltaic panel with the earth fault by using the terminal voltage and an output voltage of the photovoltaic string before the voltage disturbance, or obtaining a photovoltaic panel with the earth fault by using the terminal voltage and an output voltage of the photovoltaic string after the voltage disturbance.

11. The method for detecting an earth fault of a photovoltaic string according to claim 10, wherein determining the photovoltaic string with the earth fault based on the terminal voltage of each photovoltaic string before the voltage disturbance and the terminal voltage of each photovoltaic string after the voltage disturbance further comprises:
when an absolute value of a difference between the terminal voltage of the photovoltaic string before the voltage disturbance and the terminal voltage of the photovoltaic string after the voltage disturbance exceeds a preset threshold, determining that the photovoltaic string is a photovoltaic string with the earth fault.

12. The method for detecting an earth fault of a photovoltaic string according to claim 11, wherein performing the voltage disturbance on each photovoltaic string further comprises:
controlling an output voltage of a voltage-disturbed photovoltaic string to change along a voltage increasing direction or change along a voltage decreasing direction.

13. The method for detecting an earth fault of a photovoltaic string according to claim 12, wherein controlling the output voltage of the voltage-disturbed photovoltaic string to change along the voltage decreasing direction further comprises:
controlling the output voltage of the voltage-disturbed photovoltaic string to change from an open-circuit voltage before the voltage disturbance to a first preset voltage after the voltage disturbance, wherein the first preset voltage is less than the open-circuit voltage.

14. The method for detecting an earth fault of a photovoltaic string according to claim 13, wherein the performing the voltage disturbance on each photovoltaic string further comprises:

controlling the output voltage of the voltage-disturbed photovoltaic string to change from an open-circuit voltage before the voltage disturbance to a short-circuit voltage after the voltage disturbance.

15. The method for detecting an earth fault of a photovoltaic string according to claim 11, wherein the obtaining the photovoltaic panel with the earth fault by using the terminal voltage and the output voltage of the photovoltaic string before the voltage disturbance further comprises:
obtaining the photovoltaic panel with the earth fault by using a proportion between the terminal voltage and the output voltage of the photovoltaic string with the earth fault before the voltage disturbance and by using a quantity N of photovoltaic panels that are comprised in the photovoltaic string and that are connected in series.

16. The method for detecting an earth fault of a photovoltaic string according to claim 15, wherein the obtaining the photovoltaic panel with the earth fault by using the proportion between the terminal voltage and the output voltage of the photovoltaic string with the earth fault before the voltage disturbance and by using the quantity N of the photovoltaic panels that are comprised in the photovoltaic string and that are connected in series further comprises:
when the terminal voltage is the voltage to earth of the positive electrode, obtaining the photovoltaic panel with the earth fault according to the following formula:

$$x = N*(Upv+/Upv); \text{ or}$$

when the terminal voltage is the voltage to earth of the negative electrode, obtaining the photovoltaic panel with the earth fault according to the following formula:

$$x = N*(1-|Upv-|/Upv), \text{ wherein}$$

Upv+ represents the voltage to earth of the positive electrode before the voltage disturbance, Upv− represents the voltage to earth of the negative electrode before the voltage disturbance, Upv represents the output voltage before the voltage disturbance, N represents the quantity of photovoltaic panels that are comprised in the photovoltaic string with the earth fault and that are connected in series, and x represents the $x^{th}$ photovoltaic panel starting from the positive electrode of the photovoltaic string with the earth fault.

17. The method for detecting an earth fault of a photovoltaic string according to claim 11, wherein the obtaining the photovoltaic panel with the earth fault by using the terminal voltage and the output voltage of the photovoltaic string after the voltage disturbance further comprises:
obtaining the photovoltaic panel with the earth fault by using a proportion between the terminal voltage and the output voltage of the photovoltaic string with the earth fault after the voltage disturbance and by using a quantity N of photovoltaic panels that are comprised in the photovoltaic string and that are connected in series.

18. The method for detecting an earth fault of a photovoltaic string according to claim 17, wherein the obtaining the photovoltaic panel with the earth fault by using the proportion between the terminal voltage and the output voltage of the photovoltaic string with the earth fault after the voltage disturbance and by using the quantity N of the photovoltaic panels that are comprised in the photovoltaic string and that are connected in series further comprises:
when the terminal voltage is the voltage to earth of the positive electrode, obtaining the photovoltaic panel with the earth fault according to the following formula:

$$X = N*(Uv+/Uv); \text{ or}$$

when the terminal voltage is the voltage to earth of the negative electrode, obtaining the photovoltaic panel with the earth fault according to the following formula:

$$x = N*(1-|Uv-|/Uv), \text{ wherein}$$

Uv+ represents the voltage to earth of the positive electrode after the voltage disturbance, Uv− represents the voltage to earth of the negative electrode after the voltage disturbance, Uv represents the output voltage after the voltage disturbance, N represents the quantity of photovoltaic panels that are comprised in the photovoltaic string with the earth fault and that are connected in series, and x represents the $x^{th}$ photovoltaic panel starting from the positive electrode of the photovoltaic string with the earth fault.

19. A photovoltaic device comprising:
a power conversion circuit;
a controller; and
a voltage detection circuit, wherein
the power conversion circuit and a photovoltaic string are in a one-to-one correspondence, and each photovoltaic string is connected to a corresponding power conversion circuit;
the voltage detection circuit is configured to obtain a terminal voltage of each photovoltaic string before voltage disturbance, wherein the terminal voltage is a voltage to earth of a positive electrode or negative electrode of the photovoltaic string;
the controller is configured to perform voltage disturbance on each photovoltaic string;
the voltage detection circuit is further configured to obtain a terminal voltage of each photovoltaic string after the voltage disturbance;
the controller is further configured to determine a photovoltaic string with an earth fault based on the terminal voltage of each photovoltaic string before the voltage disturbance and the terminal voltage of each photovoltaic string after the voltage disturbance; and for the photovoltaic string with the earth fault, obtain a photovoltaic panel with an earth fault by using the terminal voltage and an output voltage of the photovoltaic string before the voltage disturbance, or
obtain a photovoltaic panel with the earth fault by using the terminal voltage and an output voltage of the photovoltaic string after the voltage disturbance.

20. The photovoltaic device according to claim 19, wherein the controller is further configured to:
when an absolute value of a difference between the terminal voltage of the photovoltaic string before the voltage disturbance and the terminal voltage of the photovoltaic string after the voltage disturbance exceeds a preset threshold, determine that the photovoltaic string is the photovoltaic string with the earth fault.

* * * * *